United States Patent [19]

Nagase

[11] Patent Number: 5,687,384
[45] Date of Patent: Nov. 11, 1997

[54] PARSING SYSTEM

[75] Inventor: Tomoki Nagase, Kawasaki, Japan

[73] Assignee: Fujitsu Limited, Kawasaki, Japan

[21] Appl. No.: 322,382

[22] Filed: Oct. 12, 1994

[30] Foreign Application Priority Data

Dec. 28, 1993 [JP] Japan ................... 5-352369

[51] Int. Cl.$^6$ ................................................ G06F 17/27
[52] U.S. Cl. ..................... 395/759; 395/752; 395/754
[58] Field of Search ..................................... 395/751, 752, 395/754, 757, 759, 760

[56] References Cited

U.S. PATENT DOCUMENTS

| | | | |
|---|---|---|---|
| 5,285,386 | 2/1994 | Kuo | 395/752 |
| 5,418,717 | 5/1995 | Su et al. | 395/759 |
| 5,442,780 | 8/1995 | Takanashi et al. | 395/601 |
| 5,511,213 | 4/1996 | Correa | 395/800 |

*Primary Examiner*—Jeffery Hofsass
*Assistant Examiner*—Andrew Hill
*Attorney, Agent, or Firm*—Staas & Halsey

[57] ABSTRACT

A subject-of-analysis input section inputs an input sentence or phrase to be analyzed. A dictionary unit holds dictionary data for dictionary consultation for a language of the input sentence. A morphemic analyzer consults the dictionary for the input sentence and recognizes breaks between every input word. A grammatical rule unit holds grammatical rules for parsing in the form of a general context-free grammar. A parsing unit applies the grammatical rules to the input sentence for parsing of the sentence. An analysis table unit stores the analysis intermediate results by the parsing unit in predetermined storage locations and holds an analysis table for storing the storage locations for the intermediate analysis results and/or pointers to the storage locations. The intermediate analysis result information in the analysis table unit includes syntactic category information and at least one of syntactic, semantic and control attributes.

19 Claims, 21 Drawing Sheets

1: S → NP(THIRD PERSON, SING, PRESENT) V(WITH s)

−1: S → NP(SECOND PERSON) V(WITH s)

| CATEGORY | S |
| GRAMMATICAL MARKS | 1 |

A

| CATEGORY | S |
| GRAMMATICAL MARKS | −1 |

B

PARSING SYSTEM

BACKGROUND OF THE INVENTION

1. Field of the Invention

This invention relates to a parsing (syntax analysis) system suitable for a machine translation system. More specifically, this invention relates to a parsing system for parallel-parsing sentences of a natural language adapting a context-free grammar.

2. Description of the Related Art

For example, with machine translation systems, in order to translate exactly input sentences or phrases to sentences or phrases of another language, it is necessary to conduct a proper syntax analysis of the input sentences or phrases. For this reason, the syntax analysis or parsing in machine translation is an important element for determining the performance of machine translation itself.

The parsing methods based on context-free grammars are roughly classified into two methods: (1) backtracking parsing (or depth-first parsing), and (2) parallel parsing (or breadth-first parsing). Of these methods, it is the parallel parsing method that has attracted much attention in recent years mainly in terms of performance and application.

Typical examples of parallel parsing are the CYK (Cocke-Younger-Kasami) method, the chart parsing method, and the Earley method.

The CYK method is an efficient parsing method which uses a two-dimensional parsing table and proceeds with analysis without backtracking while writing intermediate, or partially completed, results of the analysis into that table. With this CYK method, however, the rules for parsing are restricted to a class, called Chomsky normal form, of context-free grammars, namely, a class that has one or two daughter categories. That is, the rules as defined by

A→B
A→B C will be dealt with by the CYK method because they are in the Chomsky normal form. However, the rules as defined by

A→B C D
A→B C D F cannot be dealt with by the CYK method because they are not in the Chomsky normal form.

In contrast, the chart method can deal with a context-free grammar in which there is a number N of general daughter categories. But this method is not a specific analysis technique unlike the CYK method and merely proposes schemata for parsing algorithms. To implement the chart method in a parsing system and the like, therefore, it is necessary to devise an efficient algorithm for each individual system.

Parallel parsing is an excellent technique which permits concurrent analysis of ambiguities of an original sentence and is normally provided, as described above, with an area which stores the results of analysis of subtrees at an intermediate stage in the analysis. As the results of analysis of subtrees, the results of dictionary consultations are stored first. On this basis repeated application of the grammar is made.

In this case, for a word with many parts of speech, it is usual to store that word for each of its parts of speech. Some words may have different meanings even for the same part of speech. These words may not be analyzed correctly. In addition, in the presence of idioms or in the case where multiple strings of words that differ in length (i.e., in the number of words) are hit or encountered, correct analysis cannot sometimes be made.

As described above, the CYK method, one of the parallel parsing methods, has a problem that the rules for analysis are restricted to a restrictive type of context-free grammar, i.e., the so-called Chomsky normal form in which the number of daughter categories is one or two. The chart method, when it is actually implemented in a system or the like, requires an efficient algorithm to be devised for each system because it is not a specific analysis technique but merely proposes parsing algorithm schemata. In the parallel parsing method, when the results of analysis of subtrees are stored in the middle of the analysis, a word with many parts of speech is normally stored for each part of speech. A word having different meanings even for the same part of speech may not be analyzed correctly. In addition, in the presence of idioms or in the case where multiple strings of words of different lengths are hit, correct analysis cannot sometimes be made.

SUMMARY OF THE INVENTION

It is an object of the present invention to provide a parsing system which permits efficient and exact parsing to be achieved.

It is another object of the present invention to provide a parsing system which is as efficient as the CYK method and permits a general context-free grammar to be dealt with as parsing rules.

It is still another object of the present invention to provide a parsing system which permits words containing words with diverse meanings, words which may be idioms and multiple word strings of different lengths to be processed concurrently and permits the accuracy of parsing natural languages to be improved.

A parsing system of the present invention stores the intermediate results of an analysis in predetermined storage locations and holds an analysis table which stores the storage locations for the intermediate results of the analysis and/or pointers to those storage locations. The intermediate results of the analysis include information on syntactic categories and at least one of parsing attributes. Thus, the present invention permits an efficient and accurate syntax analysis to be made.

That is, the parsing system of the present invention comprises a subject-of-analysis input unit, dictionary unit, morphemic analyzer, grammatical rule unit, parsing unit, and analysis table unit.

The subject-of-analysis input unit designates and inputs a sentence or phrase to be analyzed.

The dictionary unit holds dictionary data for dictionary consultation for a language in which the input sentence belongs.

The morphemic analyzer performs dictionary consultation on the input sentence and recognizes breaks between every input word to thereby divide the input sentence into morphemes.

The grammatical rule unit holds grammatical rules for parsing sentences of a context-free grammar.

The parsing unit makes a syntax analysis of the input sentence by applying the grammatical rules thereto.

The analysis table unit stores the intermediate results of the analysis by the parsing unit in predetermined storage locations and holds an analysis table which stores the storage locations for the intermediate results of the analysis and/or pointers to the storage locations.

The intermediate results of the analysis in the analysis table unit include syntactic category information and parsing attribute information. The parsing attribute information typically contains at least one of syntactic, semantic, and control attributes.

The intermediate results of the analysis may include information that describes a distinction between a complete subtree that has fully satisfied the rules and an incomplete subtree that has partially satisfied the rules. In this case, the analysis table unit is allowed to have, as the analysis table, an inactive-edge table for the incomplete subtree and an inactive-edge table for the complete subtree.

The analysis table unit may include, as the analysis table, a rule reference table using grammatical rules as keys.

The parsing system may be further provided with an analysis preprocessing unit which carries out preprocessing after dictionary consultation and before syntax analysis to thereby improve the accuracy of the analysis.

The analysis preprocessing unit may be arranged to look up polysemic words in each of word groups after dictionary consultation and, if they are found, add some or all of them to the analysis table beforehand.

The analysis preprocessing unit may be arranged to examine the possibility that each of the word groups after dictionary consultation may be an idiom and, if there is the possibility of an idiom, add its central word and invariant portion to the analysis table beforehand. In this case, the central word of an idiom added to the analysis table may be furnished with an attribute indicating a grammatical feature of that idiom.

The analysis preprocessing unit, when words after dictionary consultation include an entry constructed of two or more words, may add each of the words in the entry to the analysis table for later analysis. In this case, the constituent words of the entry may be added to the analysis table only when the first word has a given attribute.

The parsing unit may evaluate candidates or probables for a plurality of subtrees corresponding to the same partial character string and decide ranking among them in accordance with predetermined criteria.

The analysis table unit may assign, as an attribute, information on the frequencies of appearance of every word counted by part of speech, and, as the criteria for ranking, the parsing unit may establish priority among the subtrees with priority increasing in ascending order of frequencies of appearance of words therein.

The analysis table unit may assign, as an attribute, information as to how many times the rules have been applied, and, as the criteria for ranking, the parsing unit may establish priority among subtrees with priority increasing in descending order of the number of times the rules are applied.

The analysis table unit may assign, as an attribute, information on the total of distances between every modifier and modified word, and the parsing unit may establish, as the criteria for ranking, priority among subtrees with priority increasing in decreasing order of the total of distances.

The analysis table unit may assign, as an attribute, information on the total of marks assigned to the applied rules, and the parsing unit may establish, as the criteria for ranking, priority among subtrees with priority increasing in increasing order of the total of marks assigned to the applied rules.

The analysis table unit may assign, as an attribute, information on an evaluation value for a semantic distance between a modifier and a modified word, and the parsing unit may establish, as the criteria for ranking, priority among subtrees with priority increasing in increasing order of the evaluation value.

The parsing unit may make unavailable for subsequent analysis some of analysis tree candidates of low ranking of a plurality of analysis tree candidates for the same partial character string among which ranking has been established. In this case, the parsing unit may be arranged to, when it failed in the entire analysis, retry the failed analysis using the analysis trees candidates which have been made unavailable previously to make up for failed analysis trees.

The parsing system of the present invention can be expanded so that a general context-free grammar can be dealt with as rules for analysis while making use of the efficiency of the CYK method. Further, it facilitates grammar description in machine translation by way of example and speeds up the execution of parsing.

Moreover, the parsing system of the present invention, provided with the analysis preprocessing unit for carrying out preprocessing prior to parsing, enables words with diverse meanings, the possibility of idioms, and words of different lengths to be processed concurrently, improving the accuracy of parsing of a natural language.

Furthermore, the parsing system, which stores the intermediate analysis results for subtrees in the analysis table, is allowed to utilize the previous analysis results as they are at the time of a reanalysis, improving the quality and performance of parsing. Thereby, the parsing system is permitted to narrow down search for each of subtrees not only on the level of words but also at all stages of rule application, permitting a more efficient syntax analysis.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

<FIRST EMBODIMENT>

Figure 1:
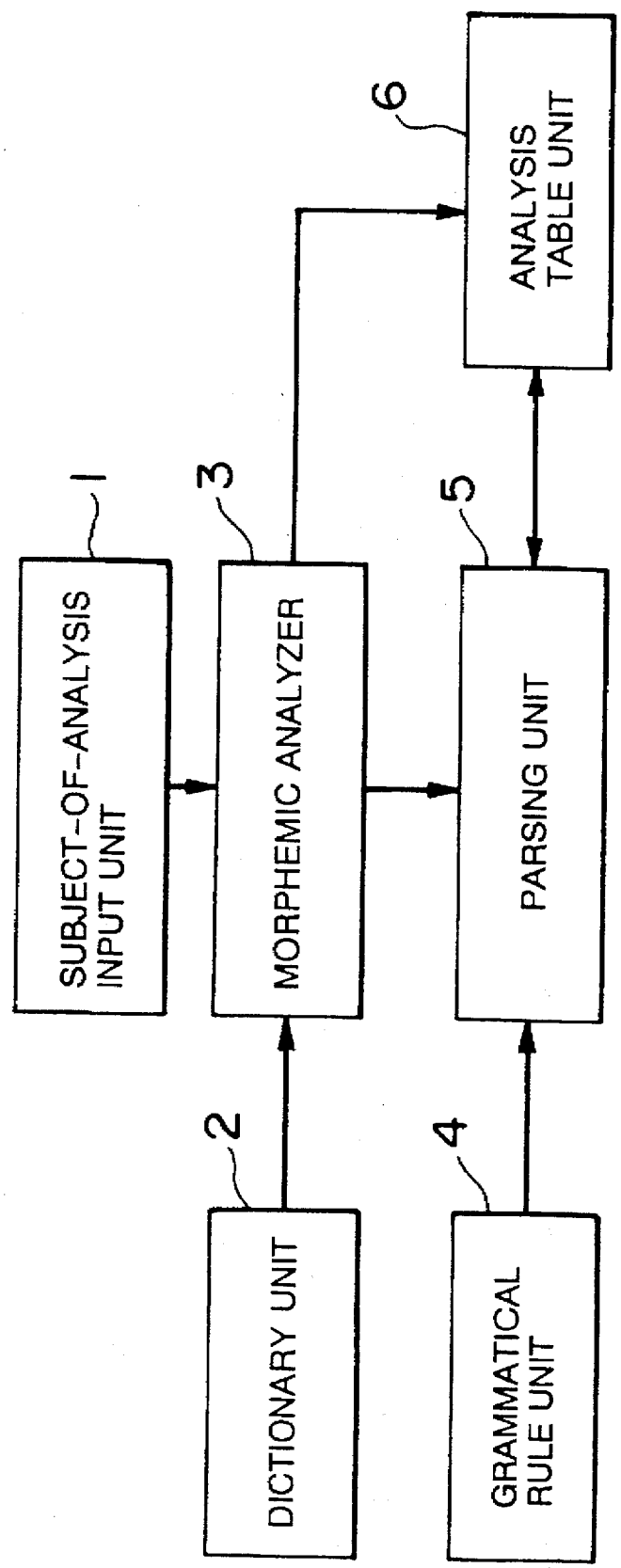
FIG. 1 is a basic block diagram of a parsing system according to a first embodiment of the present invention.

Referring now to FIG. 1, there is shown, in simplified block diagram form, a parsing system according to a first embodiment of the present invention, which comprises a subject-of-analysis input unit 1, a dictionary unit 2, a morphemic analyzer 3, a grammatical rule unit 4, a parsing unit 5, and an analysis table 6.

The input unit 1 designates and inputs sentences or phrases which are the subject of analysis.

The dictionary unit 2 holds dictionary data for dictionary consultation of a language in which the subject of analysis belongs.

The morphemic analyzer 3 consults the dictionary unit 2 for an input sentence, the subject of analysis, from the input unit 1, recognizes breaks between every input word, and divides the input sentence into morphemes.

The grammatical rule unit 4 holds grammatical rules for syntax analysis which conform to a general context-free grammar.

The parsing unit 5 applies the grammatical rules to conduct syntax analysis (parsing).

The analysis table unit 6 stores the intermediate results of analysis by the parsing unit 5 in its predetermined storage areas and holds an analysis table into which the storage areas for the intermediate results of the analysis and/or pointers to the storage areas are entered.

Information on the intermediate results of the analysis in the analysis table unit 6 includes syntactic-category information and parsing attribute information. The parsing attribute includes at least one of syntactic, semantic, and control attributes.

The parsing system of the first embodiment can be expanded so that it can deal with a general context-free grammar as the rules for analysis while making use of the efficient performance of the CYK method. Therefore, this system facilitates grammatical description for machine translation by way of example and improves the speed at which the parallel parsing is executed.

<SECOND EMBODIMENT>

Figure 2:
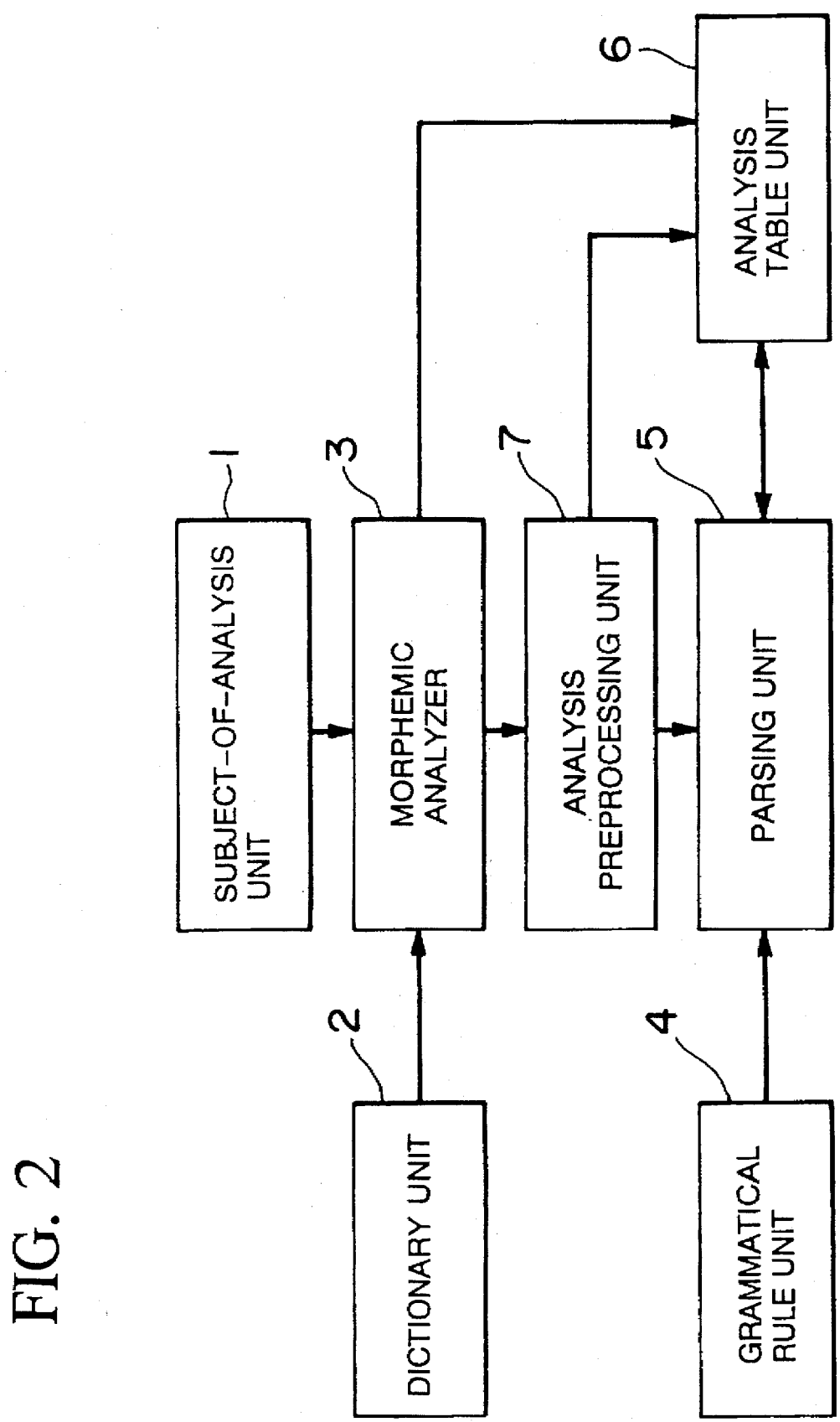
FIG. 2 is a basic block diagram of a parsing system according to a second embodiment of the present invention.

FIG. 2 shows, in simplified block diagram form, a parsing system according to a second embodiment of the present invention.

This parsing system comprises a subject-of-analysis input unit 1, a dictionary unit 2, a morphemic analyzer 3, a grammatical rule unit 4, a parsing unit 5, an analysis table unit 6, and an analysis preprocessing unit 7.

The subject-of-analysis input unit 1, the dictionary unit 2, the morphemic analyzer 3, the grammatical rule unit 4, the parsing unit 5, and the analysis table unit 6, are substantially the same as the corresponding units in FIG. 1. Thus, their detailed description is omitted herein.

The analysis preprocessing unit 7 carries out preprocessing for increasing the accuracy of the analysis after dictionary consultation and before parsing.

More specifically, the analysis preprocessing unit 7 looks up polysemic words (words each with diverse meanings) in a group of words resulting from dictionary consultation, and, if they are found, adds some or all of them in the analysis table in advance. Moreover, the analysis preprocessing unit 7 examines the possibility of the presence of an idiom in a group of words resulting from dictionary consultation and, if that possibility is found, adds its central word and invariant word in the analysis table in advance. Furthermore, when words resulting from dictionary consultation contain an entry composed of two or more words, the analysis preprocessing unit 7 adds, as needed, the words constructing that entry in the analysis table for later analysis.

Not only can this parsing system be expanded so that it can deal with a general context-free grammar as rules for analysis while making use of the efficient performance of the CYK method, but it can process concurrently words including polysemic words, idioms, and words of different lengths by the provision of the analysis preprocessing unit, improving the accuracy of syntax analysis of a natural language.

<THIRD EMBODIMENT>

Figure 3:
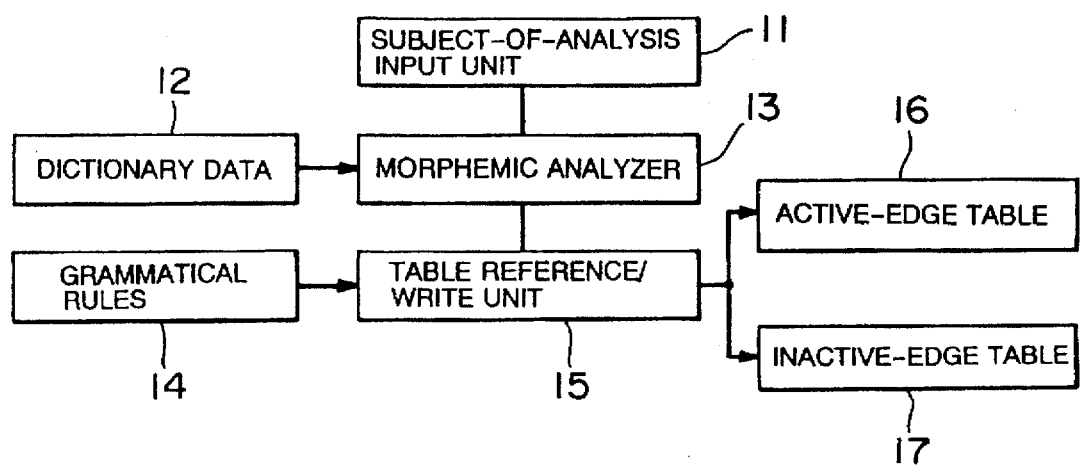
FIG. 3 is a block diagram of a parsing system according to a third embodiment of the present invention.

Referring to FIG. 3, there is shown, in block diagram form, a parsing system according to a third embodiment of the present invention, which is a more specific version of the parsing system of FIG. 1.

The parsing system of FIG. 3 comprises a subject-of-analysis input unit 11, a dictionary unit 12, a morphemic analyzer 13, a grammatical rule unit 14, a table lookup/write unit 15, an active-edge table unit 16, and an inactive-edge table unit 17.

The input unit 11 designates and inputs a sentence or phrase to be analyzed.

The dictionary unit 12 holds dictionary data for dictionary consultation of a language in which the input belongs.

The morphemic analyzer 13 consults the dictionary unit 12 for the input from the input unit 1, recognizes breaks between every input word, and divides the input into morphemes.

The grammatical rule unit 14 holds grammatical rules for syntax analysis which conform to a general context-free grammar.

The table lookup/write unit 15, which corresponds to the parsing unit 5 of FIG. 1, applies the grammatical rules for parsing and looks up and writes into the active-edge table unit 16 and the inactive-edge table unit 17.

The active-edge table unit 16 and the inactive-edge table unit 17, corresponding to the analysis table unit 6 of FIG. 1, respectively hold an active-edge table and an inactive-edge table each of which stores storage locations in which active and inactive edges obtained as the intermediate results of an analysis are respectively stored or pointers to the storage locations are respectively stored.

Suppose here that the contents of the grammatical rules, the dictionary and the input sentence are as follows.

<GRAMMATICAL RULES>

| | | | | |
|---|---|---|---|---|
| (1) S | → | NP | VP | |
| (2) NP | → | DET | N | |
| (3) NP | → | N | | |
| (4) VP | → | V | NP | |
| (5) VP | → | V | NP | NP |
| (6) VP | → | V | | |
| (7) NP | → | PRON | | |

<DICTIONARY>

| | | |
|---|---|---|
| DET | = | the |
| DET | = | a |
| N | = | boy |
| N | = | toy |
| V | = | gives |
| PRON | = | you |

<INPUT SENTENCE>

The boy gives you a toy.

(where S=sentence, N=noun, V=verb, NP=noun phrase, VP=verbal phrase, DET=determiner, PRON=pronoun)

Upon receipt of the input sentence that is the subject of syntax analysis, the morphemic analyzer 13 consults the dictionary unit 12 for the input sentence. The results of the dictionary consultation will be as follows:

| | |
|---|---|
| the | DET |
| boy | N |
| give | V |
| you | PRON |
| a | DET |
| toy | N |

The results of the morphemic analysis are passed to the table lookup/write unit 15 with each word furnished with such a attribute specified in the dictionary as indicates its part of speech.

Figure 4A:
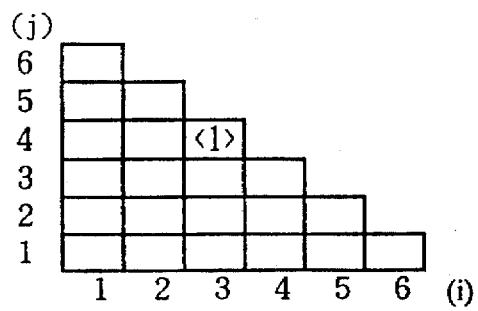
FIG. 4 is a diagram illustrating an inactive-edge/active-edge table format which is useful in explaining the operation of the parsing system of FIG. 3.
Figure 4B:
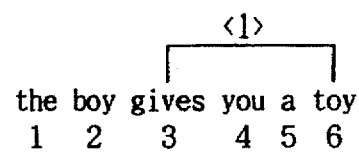

Tables written into by the table write unit 15 include an inactive-edge table and an active-edge table. Each of these tables is nearly triangular in shape as shown in FIG. 4. The numerals in the horizontal direction (in the column direction) indicate the locations of the respective words within a sentence, while the numerals in the vertical direction (in the row direction) indicate the number of words.

In the table, the box, i.e., the cell, in the i-th column and j-th row corresponds to a string of words with a length of j from the i-th word in the original sentence. For example, the cell <1>in the third column and the fourth row corresponds to a string of words with a length of four words from the third word, i.e., "gives you a toy".

Here, the terms used in the chart method are used for the sake of convenience.

The inactive edge refers to a string of words in an original sentence which satisfies the grammatical rules completely. For example, "the boy" and "gives you (a) toy" satisfy the rule (2) NP→DET N and the rule (5) VP→V NP NP, respectively. Thus, they each form an inactive edge.

The active edge refers to a string of words which simply satisfies part of the grammatical rules and may be said to be on its way to an inactive edge. For example, the word string, "gives you", satisfies up to two of the daughter categories of the rule (5), i.e., (V NP), but further needs NP at its right-hand side for complete satisfaction. Thus, that word string forms an active edge. (At the same time, "gives you" completely satisfies the rule (4) and forms an inactive edge of the rule (4), too.) Likewise, "the" itself forms an active edge of the rule (2) because it needs N at the right-hand side of it in order to form NP.

The present parsing system advances the parsing in a bottom-up fashion while writing active edges and inactive edges of all partial word strings into the active-edge table and the inactive-edge table, respectively.

Hereinafter, the process of actually analyzing an exemplary sentence will be described specifically.

Let the cells in the i-th column and the j-th row in the inactive-edge table and the active-edge table be represented by H(i, j) and K(i, j), respectively.

Upon receipt of morphemic information, the table lookup/write unit 15 first writes the result of dictionary consultation into the H(i, 1) cell in the inactive-edge table.

Figure 5A:
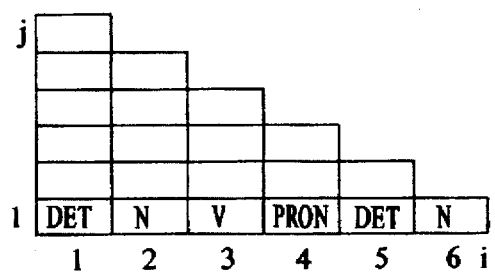
FIG. 5 is a diagram illustrating the states of the inactive-edge table and the active-edge table of FIG. 3 in which they each have been written into up to the first row.
Figure 5B:
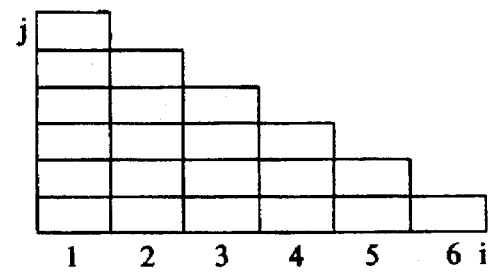

FIG. 5 shows the states of the inactive-edge and active-edge tables in which only their first row has been written into.

Figure 6B:
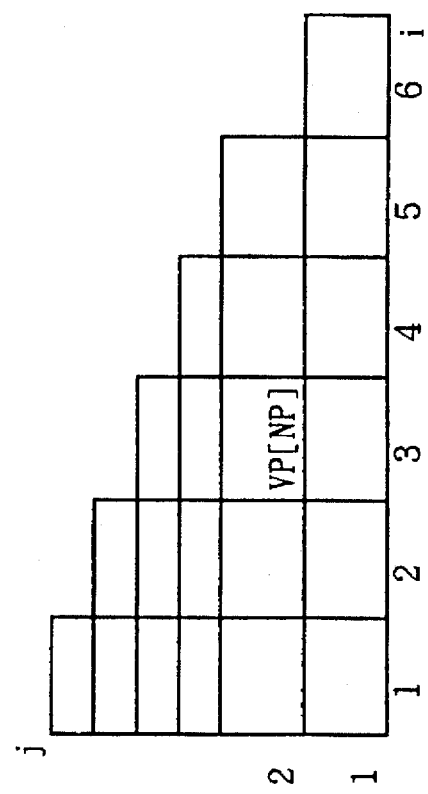
FIG. 6 is a diagram illustrating the states of the inactive-edge table and the active-edge table of FIG. 3 in which they each have been written into up to the second row.
Figure 6A:
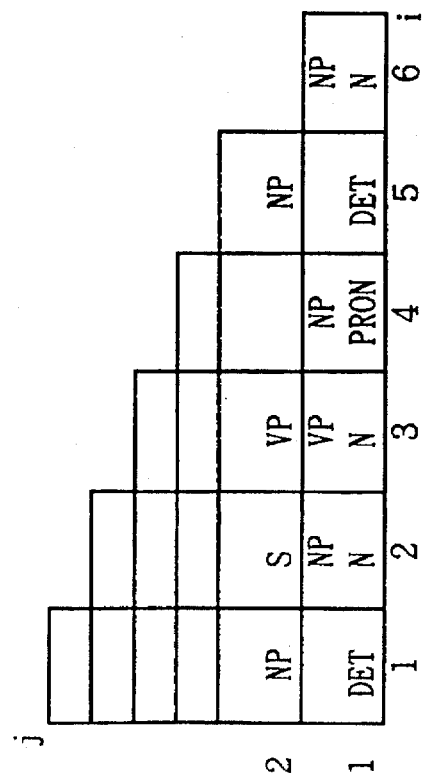

The writing into the inactive-edge table is the same as that in the CYK method. That is, when the conditions of the rules of the Chomsky normal form (each right-hand side consists of one or two categories) are satisfied, the resultant syntax or parse tree information is directly written into the inactive-edge table. In FIG. 6, there is shown the state in which inactive edges have been written into the inactive-edge table up to its second row.

In the case of rules which are not in the Chomsky normal form (i.e., the rules in which each right-hand side consists of three or more categories), a combination of successive word strings which satisfy conditions of the first and second categories is searched in the inactive-edge table, and the intermediate results are written into the active-edge table. The j-th row of the active-edge table is written into simultaneously with the j-th row of the inactive-edge table. Namely, to write into the j-th row, the cells up to the (j−1)st row in both of the tables must have been completed.

Consider now the case where the second row of the active-edge table is being written into. A search is made of two successive partial word strings in the inactive-edge table for a combination that satisfies the first and second categories of the rules in which each right-hand side consists of three or more categories (at this stage only one row of inactive edges has been completed). Then, it will be found that "give" (V)+"you" (NP) satisfies the condition of "VP→V NP NP". As a result, the condition (NP) of the remaining category and grammatical information on the mother category are written into the active-edge cell which corresponds to that word string (i=3, j=2). VP[NP] in the active-edge table of FIG. 6 means that, if the remaining term NP is satisfied, then VP will be formed.

The information on the j-th row in the active-edge table is referred to in writing into the (j+1)st row and the following rows. VP[NP] at K(3, 2) is referred to in writing into the third row and the following rows. At this point, a search is made of the inactive-edge table for a word string adjacent to K(3, 2) that includes NP. Actually, H(5, 2)="a toy" is found at the time of writing into the fourth row. Thereby, all the conditional categories are satisfied. Consequently, K(3, 2) and H(5, 2) are recorded in the H(3, 4) cell in the inactive-edge table as concatenated word string information.

In the case of a rule whose right-hand side consists of four or more categories, an inactive-edge cannot be written into the inactive-edge table even if a word string that satisfies the condition of the third category is found in the inactive-edge table. Instead, an active-edge is written into the active-edge table corresponding to a word string that satisfies up to the third category, and the fourth and following categories will be searched for in the inactive-edge table.

Figure 7B:
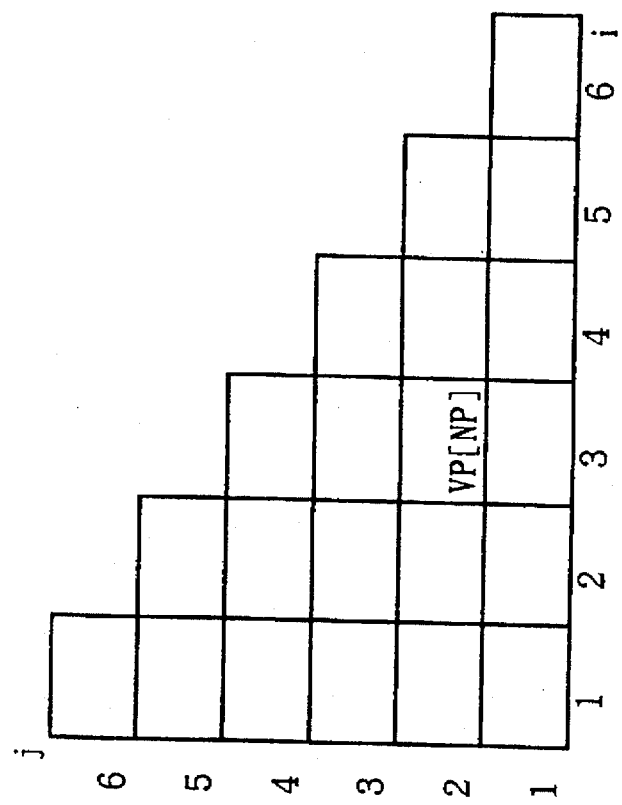
FIG. 7 is a diagram illustrating the states of the inactive-edge table and the active-edge table of FIG. 3 in which they each have been written into up to the last row.
Figure 7A:
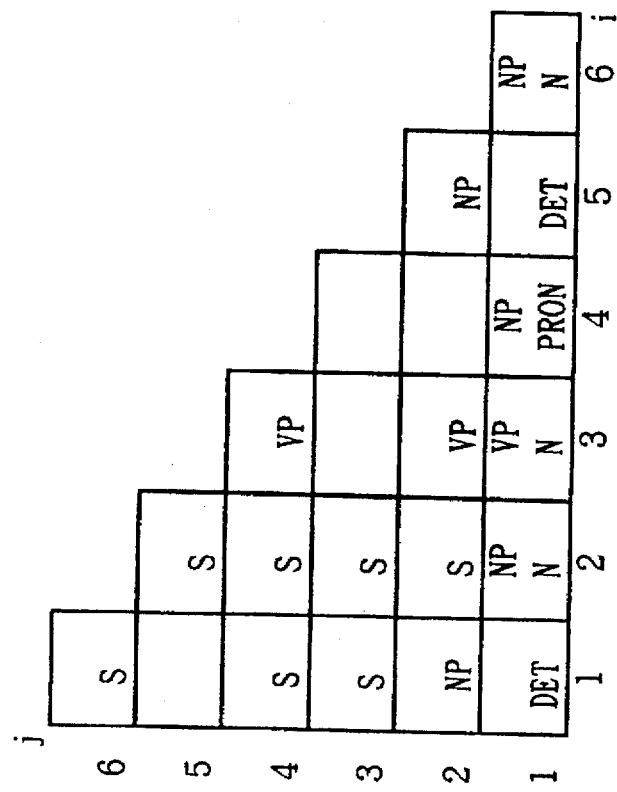

The results of writing into the active-edge table and the inactive-edge table to the end for the above exemplary sentence are shown in FIG. 7.

Figure 8:
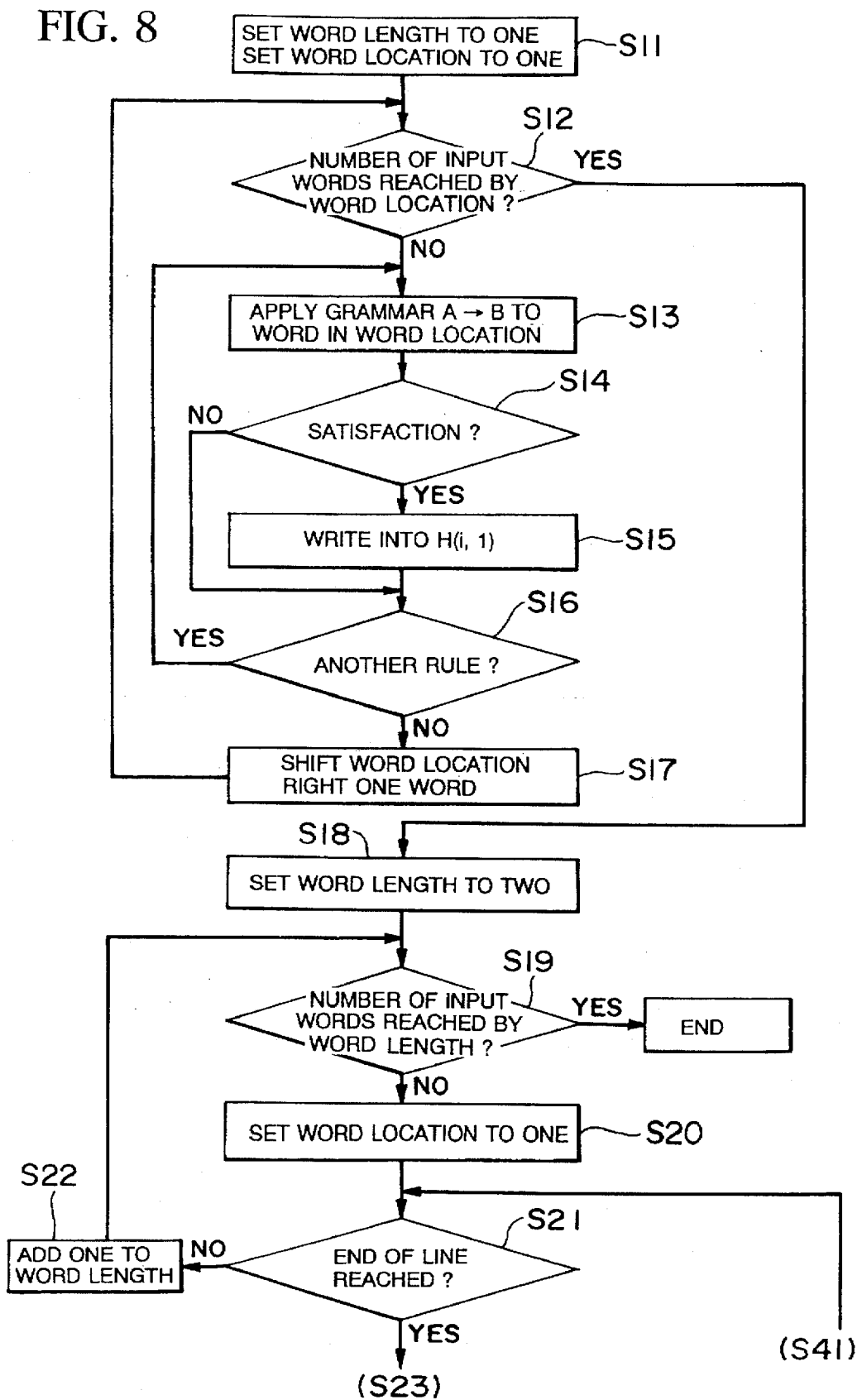
FIG. 8 illustrates a first part of a flowchart illustrating the operation of the parsing system of FIG. 3.
Figure 9:
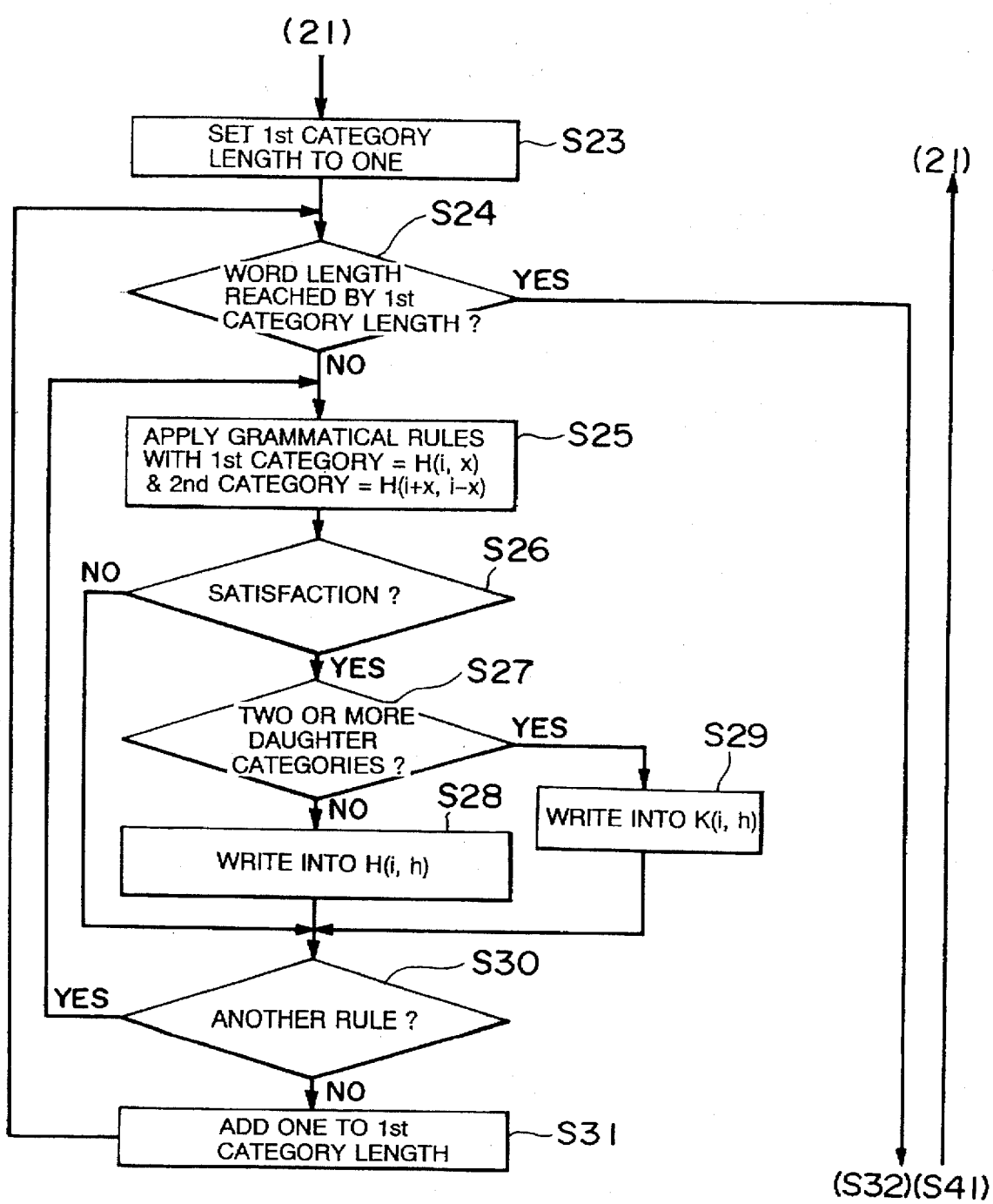
FIG. 9 illustrates a second part of the flowchart illustrating the operation of the parsing system of FIG. 3.
Figure 10:
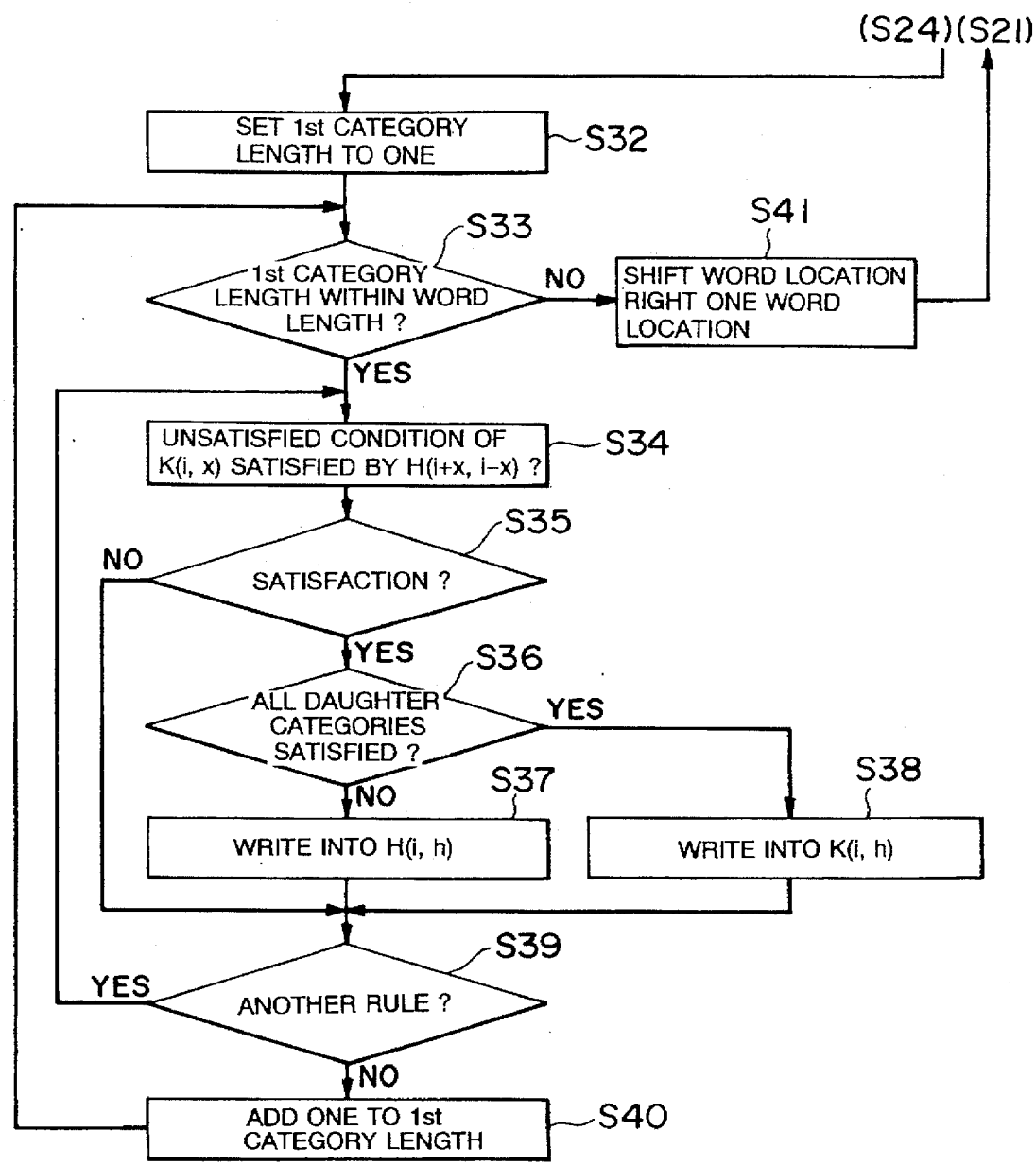
FIG. 10 illustrates a third part of the flowchart illustrating the operation of the parsing system of FIG. 3.

The table lookup/write unit 15 advances the parsing in accordance with flowcharts shown in FIGS. 8, 9 and 10 while writing the intermediate results into the active-edge table and the inactive-edge table. In this case, let the length (the number of words) of an input sentence, i.e., the number of words in an input sentence (hereinafter referred to as the number of input words) be n, the length (the number of words) of a word string, i.e., the word length be h, the leftmost location in a word string, i.e., the word location be i, and the word length of the first category (hereinafter referred to as the first category length) be x.

First, the word length h is set to one, and the word location i is set to one (step S11). Next, a decision is made as to whether or not the word location i has exceeded the number of input words n (step S12). If n is not reached, then a grammar in the form of A→B is applied to a word in the word location i (step S13). A decision is made as to whether or not the grammar applied in step S13 is satisfied (step S14). If satisfied, then H(word location i, 1) in the inactive-edge table is written into (step S15). Subsequent to step S15 or when the decision in step S14 is that the grammar is not satisfied, a decision is made as to whether or not there is another grammatical rule (step S16). When the decision in step S16 is YES, the procedure returns to step S13; otherwise, the word location i is shifted one word to the right in step S17 and the procedure returns to step S12.

When the decision in step S12 is that the word location i has exceeded the number of input words n, the word length h is set to two in step S18, and then a decision is made in step S19 as to whether or not the word length h has exceeded the number of input words, n. When the decision in step S19 is that the word length h is less than the number of input words n, the word location i is set to one (step S21) and then a decision is made as to whether or not the processing has proceeded to the end of a row (step S21). When the decision is NO, the word length h is incremented by one and the procedure returns to step S19.

When the decision in step S21 is that the preprocessing has proceeded to the end of a row, the first category length x is set to one (step 23), and then a decision is made as to whether or not the first category length x has exceeded the word length h (step S24). If the decision is that the first category length x has not exceeded the word length h, then a grammatical rule is applied in step S25 as the first category=H (word location i, first category length x) and the second category=H(word location i+first category length x, word location i–first category length x). A decision is made in step S26 as to whether or not that grammatical rule applied in step S25 is satisfied. If satisfied, then a decision is made in step S27 as to whether two or more daughter categories are involved. If NO in step S27, then the inactive-edge table H (word location i, word length h) is written into; otherwise, the active-edge table K (word location i, word length h) is written into in step S29. After step S28 or S29, or when the decision in step S26 is that the grammatical rule is not satisfied, a decision is made in step S30 as to whether or not there is another grammatical rule. If YES in step S30, then the procedure returns to step S25; otherwise, the first category length x is incremented by one in step S31 and the procedure returns to step S24.

If the decision in step S24 is that the first category length x has exceeded the word length h, then the first category length x is set to one in step S32 and a decision is made in step S33 as to whether or not the first category length x is within the word length h. If YES in step S33, then a test is made in step S34 to determine if the inactive-edge table H (word location i +first category length x, word location i–first category length x) satisfies the conditions of an unsatisfied portion of the active-edge table K (word location i, first category length x). A decision is made in step S35 as to whether or not the conditions were satisfied in step S34. If YES in step S35, then a decision is made in step S36 as to whether or not all the daughter categories have been satisfied. If NO in step S36, then the inactive-edge table K (word location i, word length h) is written into in step S37; otherwise, the active-edge table k (word location i, word length h) is written into in step S38. After step S37 or S38 or when the decision in step S35 is NO, the procedure goes to step S39 in which a decision is made as to whether or not there is another rule. If YES in step S39, then the procedure returns to step S34; otherwise, the first category length x is incremented by one in step S40 and the procedure returns to step S33.

If the decision in step S33 is that the first category length x is not within the word length h, then the word location i is shifted one word location to the right in step S41 and the procedure returns to step S21.

When the decision in step S19 is that the word length h has exceeded the number of input words n, the procedure terminates.

As described above, having two tables of two dimensions, i.e., the inactive-edge table and the active-edge table, the parsing system can offer the following advantages in making syntax analysis based on a general context-free grammar.

(a) Unlike the conventional CYK method, the parsing system of the present invention can perform analysis on any general context-free grammar. This produces a significant improvement in the efficiency of development of grammar description in machine translation.

(b) A simultaneous check is made on two successive partial word strings to determine if they satisfy the first and second categories of a grammar rule. This avoids the need of recording an active edge in the state in which only the first category is satisfied, increasing retrieval efficiency and saving a memory area needed for processing.

To increase efficiency in retrieving rules to be applied in parsing a natural language, the following modification is also possible.

Figure 11:
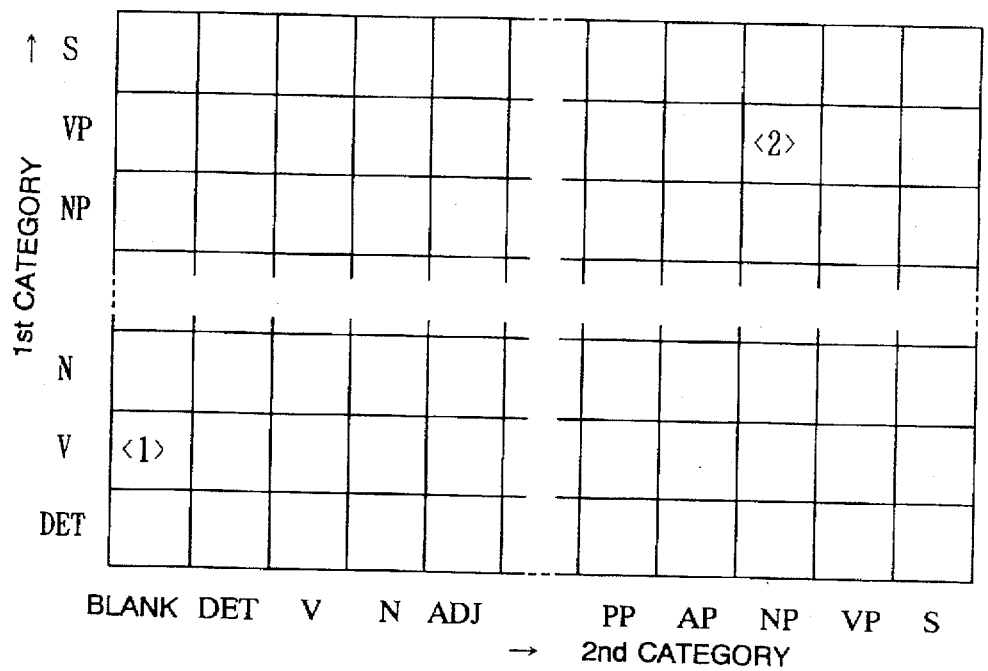
FIG. 11 is a schematic diagram of a grammar selection table for use in explanation of the operation of the parsing system of FIG. 3.

A grammar select table as shown in FIG. 11 is prepared.

The rows and columns of this table respectively correspond to the first category and the second category of daughter categories (the right-hand side) of a context-free rule. The categories are assigned consecutive code numbers beforehand. In each cell there is stored a grammar in which categories corresponding to a row and a column are the first and second daughter categories, respectively, or a pointer to the grammar.

For-example, in the cell <1>shown in FIG. 11 there is stored a rule in which the first category is "V" and the second category is null, e.g.,

VP→V
S→V

In the cell <2>of FIG. 11 there is stored a rule in which the first category is "VP" and the second category is "NP", e.g.,

VP ———▶ VP NP

VP ———▶ VP NP NP

If grammatical categories are coded beforehand in this manner, then the select table will be represented as a two-dimensional array. It thus becomes possible to find out a corresponding grammatical rule immediately from the first and second categories.

<FOURTH EMBODIMENT>

Figure 12:
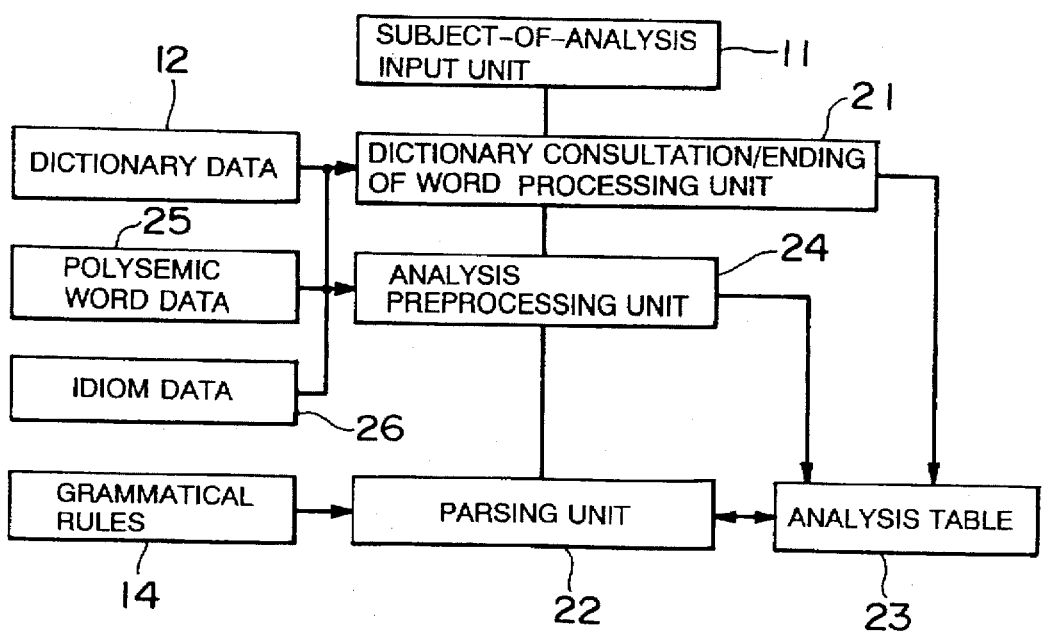
FIG. 12 is a block diagram of a parsing system according to a fourth embodiment of the present invention.

Referring now to FIG. 12, there is shown a parsing system according to a fourth embodiment of the present invention, which corresponds to a more specific arrangement of the parsing system of FIG. 2.

In FIG. 12, like reference numerals are used to denote corresponding parts to those in FIG. 3 and their detailed description is omitted.

The parsing system of FIG. 12 includes a subject-of-analysis input unit 11, a dictionary unit 12 and a grammatical rule unit 14, which are exactly the same as the corresponding components in FIG. 3, and a dictionary consultation/ending-of-word processing unit 21, a parsing unit 22, and an analysis table unit 23, which substantially correspond in function to the morphemic analyzer 13, the table lookup/write unit 15, the active-and inactive-edge table units 16 and 17 in FIG. 3. In addition to these components, the parsing system of FIG. 12 is further provided with an analysis preprocessing unit 24, a polysemic word data unit 25, and an idiom data unit 26.

The analysis preprocessing unit 24 carries out preprocessing for improving the accuracy of analysis after dictionary consultation and before syntax analysis.

The polysemic word data unit 25 stores polysemic word data and is used for retrieving polysemic words. When a polysemic word stored in the polysemic word data unit 25 is found, the analysis preprocessing unit 24 adds it to the analysis table in the analysis table unit 23.

The idiom data unit 26 stores idiom data and is used to retrieve idioms. When an idiom stored is found, the analysis preprocessing unit 24 adds its central word and its invariant word or words to the analysis table of the analysis table unit 23. In this case, an attribute indicating a grammatical feature of that idiom may be assigned to its central word added to the analysis table.

Here, as in the analysis table, use is made of a table as used in the CYK method as is the case with the parsing system of FIG. 3. In each of cells of the analysis table is stored a pointer to the result of analysis of a corresponding portion of an original sentence. In the i, j-th cell is stored information on a partial word string with a length of j words from the i-th word in the original sentence.

Figure 13:
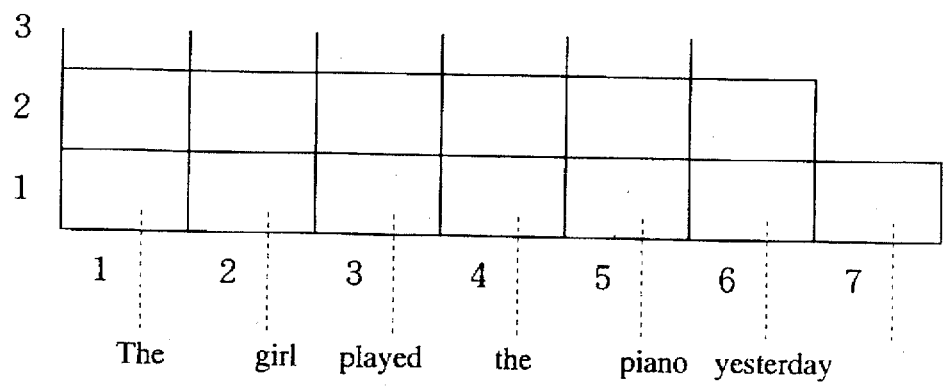
FIG. 13 is a schematic diagram for use in explanation of the analysis table in the parsing system of FIG. 12.

Through processing via the subject-of-analysis input unit 11 and the dictionary consultation/ending-of-word processing unit 21 a state is produced in which only the first row of the analysis table has been filled as shown in FIG. 13. In the cell in the first row and the i-th column is stored a pointer to information on the i-th input word.

The analysis preprocessing acts on this state and expands ambiguities such as polysemic words, idioms, words of different lengths, etc., in the table.

<POLYSEMIC WORDS>

After dictionary consultation of a sentence to be analyzed, the polysemic word data unit 25 is referred to for the respective words constructing that sentence. If a polysemic candidate is found, it is added to the first row of the analysis table. In this case, from the point of view of analysis efficiency, it is also possible to select between polysemic words that are considered to be candidates and polysemic words that don't become candidates and make only some of polysemic words candidates. In addition, polysemic word information need not necessarily be an independent table and may be retrieved as part of a dictionary entry of the dictionary unit 12.

The polysemic words described herein include not only words of different parts of speech but also words assigned different meanings in translation. Writing a syntactic attribute into polysemic word data could make a selection among meanings of a word in the process of parsing.

Figure 14:
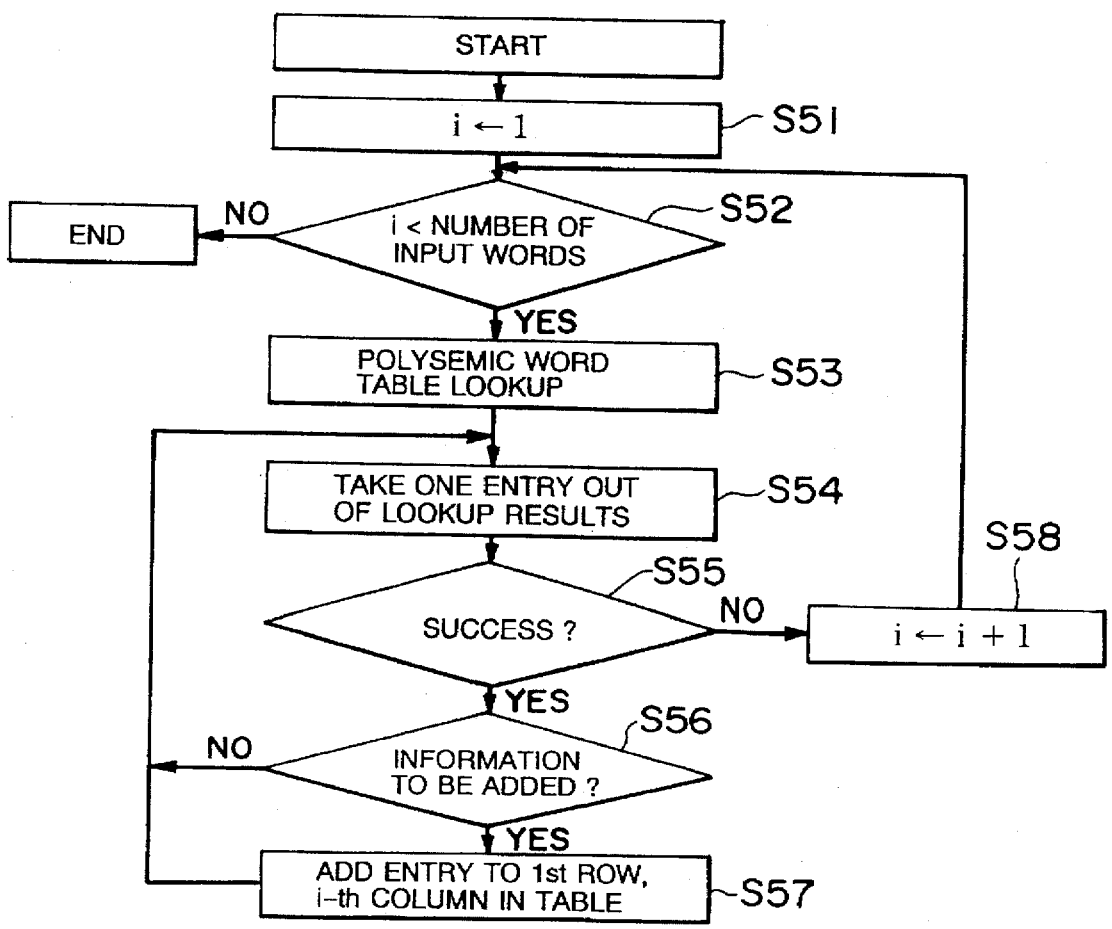
FIG. 14 is a flowchart for the operation of adding polysemic word information in the parsing system of FIG. 12.

The process of adding polysemic word information in this case is performed in such a manner as shown in FIG. 14.

First, the word location i is set to one in step S51. A decision is then made in step S52 as to whether or not the word location i is less than the number of input words, n. If the decision is that i is less than n, then the polysemic word table is searched in step S53. In step S54, a process of taking one entry out of the results of the table search is performed. A decision is made in step S55 as to whether or not the process in step S54 was successful, i.e., one entry was actually taken out. If the decision is that the process was successful, then a decision is made in step S56 as whether or not that entry is information to be added to the analysis table. If the decision is that the entry is to be added to the analysis table, then it is added to the cell in the first row and the i-th column in the analysis table in step S57 and the procedure returns to step S54. Also, if the decision in step S56 is that entry is not to be added to the table, then the procedure returns to step S54.

If the decision in step S55 is that one entry could not taken out of the results of the table search, then the word location i is incremented by one in step S58 and the procedure returns to step S52.

Next, an example of polysemic word data is shown below.

| Notation | Meaning | Attribute |
| --- | --- | --- |
| Play | to amuse oneself | Intransitive verb |
| Play | to perform music on an instrument | Transitive verb, object (instrument) |
| Play | to perform a part on the stage | transitive verb, object (play/drama) |
| ... | ... | ... |

<IDIOMS>

After dictionary consultation of a sentence to be analyzed, idiom data in the idiom data unit 26 are referred to for each of words constructing that sentence. If an idiomatic candidate is found at the i-th word, its central word information is added to the cell in the first row and the i-th column in the analysis table. Its invariant portion is written into a corresponding location in the table. For example, if the invariant portion consists of two words beginning with the j-th word, then it is written into the cell in the second row and the j-th column in the table.

At this point, identification (ID) information is assigned to the central word and the invariant portion so as to establish a correspondence therebetween. This avoids a link between a central word "look up" of "look up to" and a non-variant word "look up".

Such preparations permit idioms to be analyzed in the process of parsing. As an example, a grammatical rule can be described as follows:

verbal phrase→central word+invariant word

If a syntactic attribute is assigned to the central word of each of idioms, then a selection of an appropriate idiom can be made even when there is the possibility of many idioms.

For example, grammatical rules can be described as follows:

verbal phrase

→central word (intransitive)+invariant word verbal phrase

→central word (transitive)+invariant word+noun phrase

This permits an appropriate idiom to be selected in conformity with a sentence pattern.

A selection among idioms involves a selection of analysis using no idiom. In general, invariant words have the possibility of being prepositional phrases. Thus, analysis based on rules defined by prepositional phrase →preposition+noun phrase verbal phrase →verbal phrase+prepositional phrase will naturally be candidates.

Idiom data need not necessarily be stored in an independent table but may be held as part of dictionary entry of the dictionary unit 12 for later retrieval.

Figure 15:
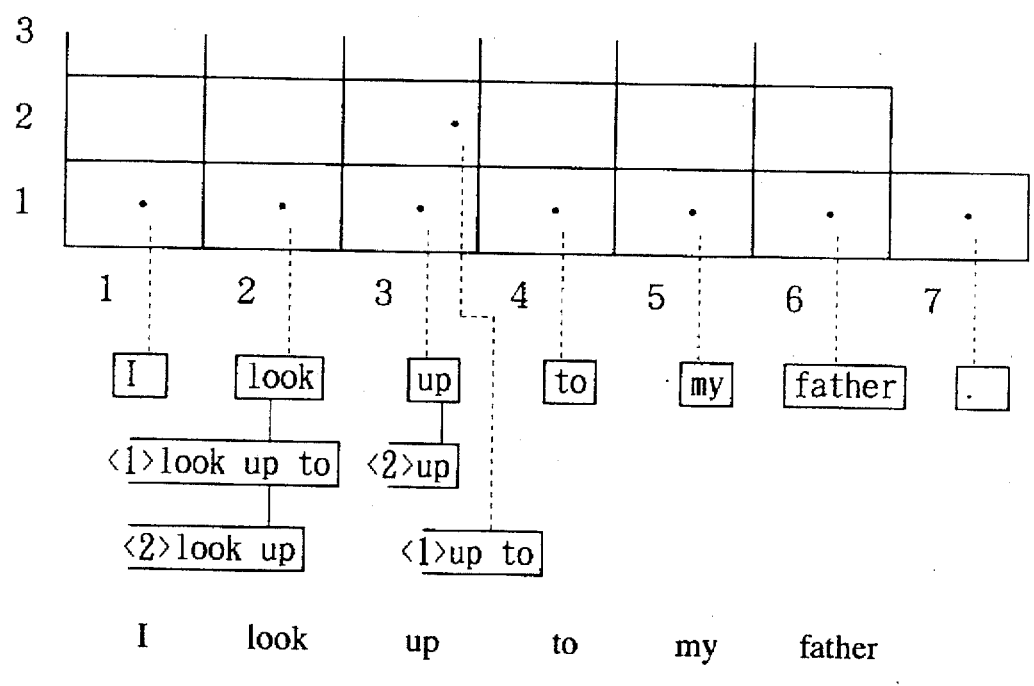
FIG. 15 is a schematic diagram for use in explanation of the parsing table after preprocessing of idioms in the parsing system of FIG. 12.

FIG. 15 shows an example of an analysis table after idiom preprocessing. In FIG. 15, information <1> on "look up to" and information <2> on "look up" are added to the analysis table as the result of idiom preprocessing.

Figure 16:
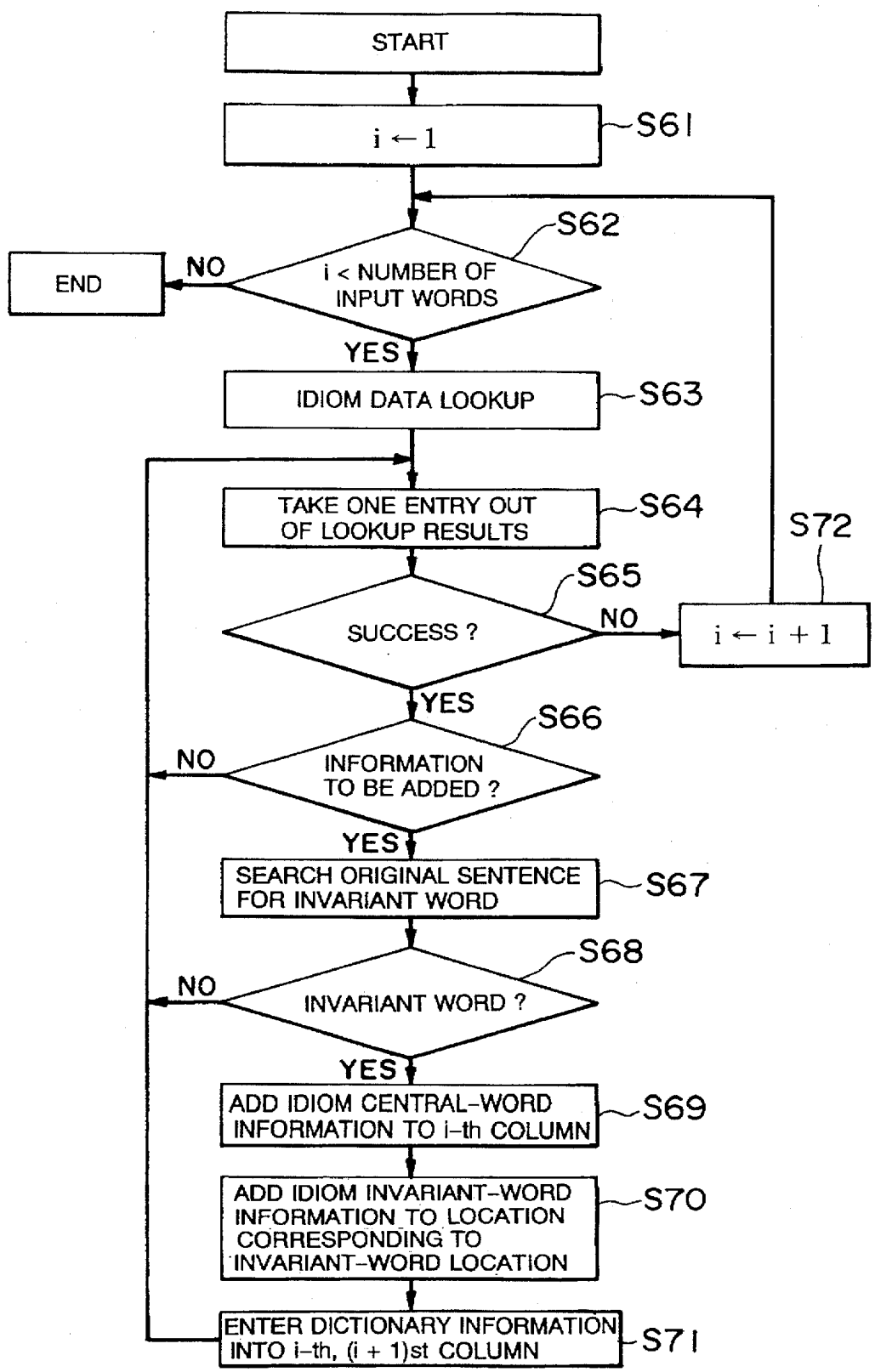
FIG. 16 is a flowchart for the operation of adding information on the possibility of idioms.

The process of adding the possibility of being an idiom is performed in such a manner as shown in FIG. 16.

First, the word location i is set to one in step S61. A decision is then made in step S62 as to whether or not the word location i is less than the number of input words, n. If the decision is that i is less than n, then idiom data is retrieved in step S63. In step S64, a process of taking one entry out of the results of the retrieval is performed. In step S65, a decision is made as to whether or not the entry taking process was performed successfully. If the decision is that entry was actually taken out, then a decision is made in step S66 as to whether or not it is to be added to the analysis table. If the decision is that it is to be added to the analysis table, then a search is made of an original sentence for an idiom's invariant word in step S67. Next, a decision is made in step S68 as to whether there is an invariant word. When there is an invariant word in the original sentence, information on the idiom's central word is added to the i-th column in the analysis table in step S69. Further, in step S70, information on the idiom's invariant word is added to a location corresponding to the location where the invariant word exists in the original sentence. Next, retrieved dictionary information is added to the i-th row and the (i+1)st column in the analysis table in step S71 and the procedure returns to step S64.

If the decision in step S66 is that no information to be added is present or the decision in step S68 is that no invariant word is present, then the procedure returns to step S64.

If the decision in step S65 is that one entry could not be taken out of the result of retrieval, then the word location i is incremented by one in step S72 and the procedure returns to step S62.

If the decision in step S62 is that the word location i is not less than the number of input words n, then the procedure terminates.

Next, an example of idiom data is shown.

| Central word | Invariant word | Meaning | Attribute |
|---|---|---|---|
| look | about | to survey | subject (living thing) |
| look | after | to take care of | subject (living thing) object (need of an object) object (living thing) |
| look | into | to examine | subject (living thing) object (need of an object) subject (living thing) |
| look | up | to admire | (need of an object) object (person) |
| look | up to | to respect | (need of an object) object (person) subject (person) |
| ... | ... | ... | ... |

<Words of Different Lengths>

To analyze some sentence, one entry in the dictionary can comprise two or more words. However, the existence of such words can make it impossible to analyze even a sentence that could be correctly analyzed so far.

For example, in order to analyze a sentence

"I don't know him at all"

it is required that, like a single word, the phrase "at all" have been entered into a dictionary as one dictionary entry.

Meanwhile, consider the following sentence

"The temperature is constant at all heights".

If, in this case, "at all" has been entered or registered as a dictionary entry and is processed as a block, it will be impossible to make analysis well.

For this reason, with a dictionary entry consisting of two or more words, a process of adding each of words as its constituent elements to the analysis table is performed as preprocessing of parallel parsing.

Figure 17:
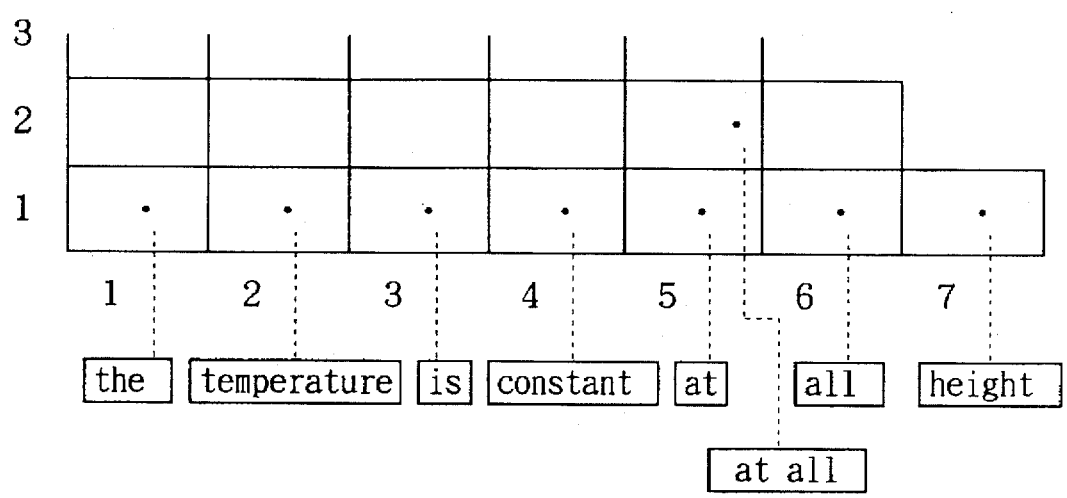
FIG. 17 is a schematic diagram for use in explanation of the analysis table indicating the results of preprocessing of words of different lengths in the parsing system of FIG. 12.

If, when an original sentence is seen from left to right, a dictionary entry that consists of two or more words is used therein, the constituent elements of that entry are each added to the analysis table so long as they each can be looked up in the dictionary. With "at all", both "at" and "all" are present in the dictionary. Therefore, the analysis table will become as shown in FIG. 17, in which case information about "at all" is stored in the second row.

Entries of technical terms and considerably idiomatic expressions contain ones whose expansion has no effect. Thus, it would also be effective to assign to original words some attribute as to whether they are to be expanded or not. In this case, only part of dictionary entries each consisting of two or more words will be expanded.

Figure 18:
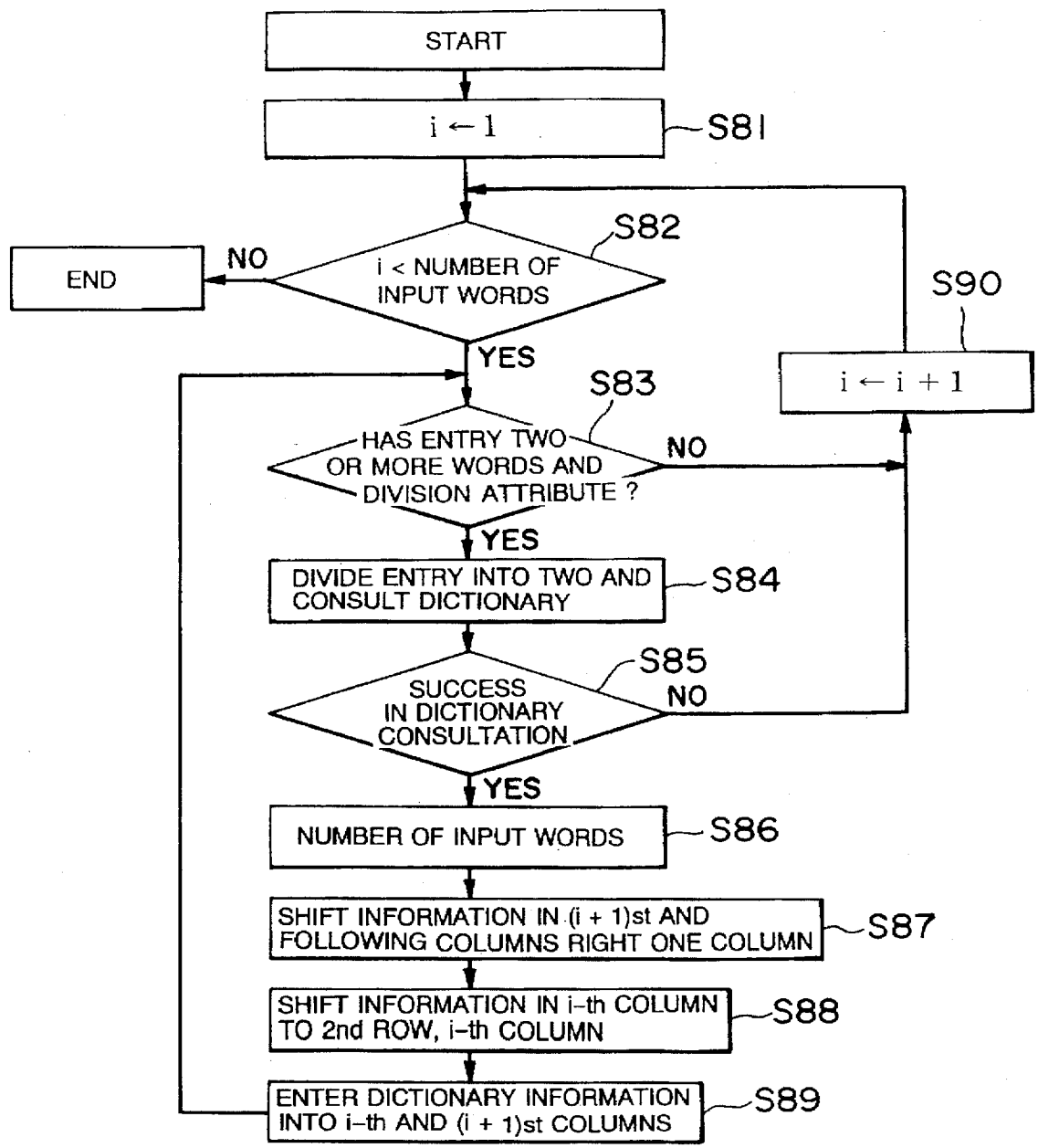
FIG. 18 is a flowchart for the operation of adding information on words of different lengths in the parsing system of FIG. 12.

The process of adding words of different lengths is performed in such a manner as shown in FIG. 18.

First, the word location i is set to one in step S81. A decision is next made in step S82 as to whether or not the word location, i, is less than the number of input words, n. If the decision in step S82 is that i is less than n, then a decision is made in step 83 as to whether or not a dictionary entry comprises two or more words and moreover it contains an attribute that specifies division. If both of the conditions are met in step S83, then that entry is divided into two words or word groups for subsequent dictionary consultation in step S84. A decision is made in step S85 as to whether or not dictionary information could actually be obtained for each of the words or word groups. If the decision is that dictionary information could be obtained, then the number of input words, n, is incremented by one in step S86, information in the (i+1)st column and the following columns is shifted one column to the right in step S87, and information in the i-th column is shifted to the i-th column in the second row in step S88. Next, that dictionary information retrieved after division of that entry is stored in the i-th row and the (i+1)st row in the analysis table in step S89 and the procedure returns to step S83.

If both of the conditions are not met in step S83 and if the decision in step S85 is that the dictionary consultation ended in failure, then the word location, i, is incremented by one in step S90 and the procedure returns to step S82.

If the decision in step S82 is that the word location, i, is not less than the number of input words, n, then the procedure is terminated.

Thus, by referring to dictionary data, polysemic word data, and idiom data prior to application of parsing grammatical rules to an input sentence and storing the possibilities of polysemic words, idioms or words of different lengths for words in the sentence in the analysis table in advance, the parallel parsing system, which makes syntax analysis while recording the process of analysis, permits their analysis to be made within the process of parsing.

This will improve the accuracy of selection among polysemic words, analysis of idioms and selection among words, which permits the quality of syntax analysis in various natural language systems, including machine translation, to be improved.

<FIFTH EMBODIMENT>

Figure 19:
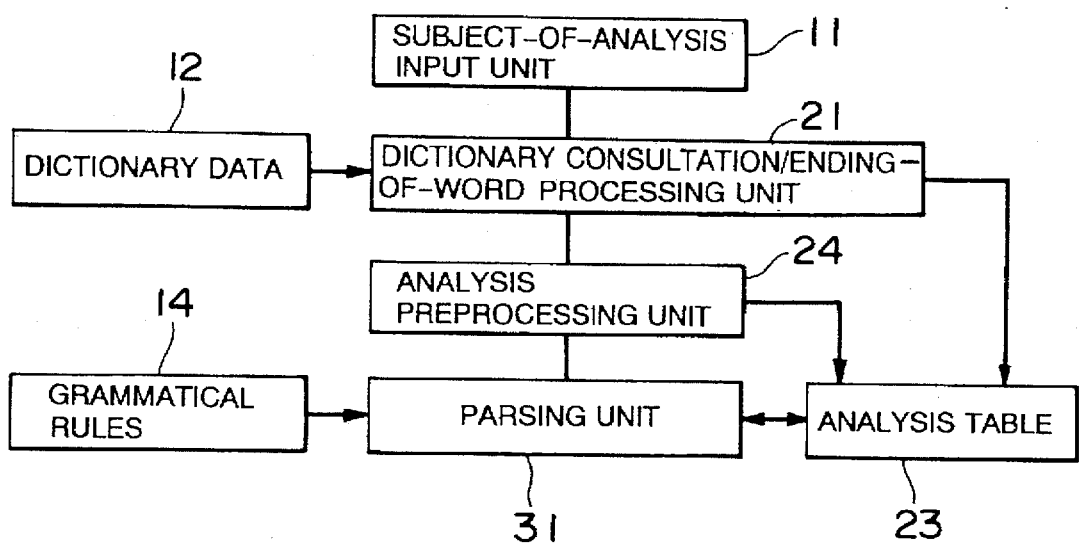
FIG. 19 is a block diagram of a parsing system according to a fifth embodiment of the present invention.

FIG. 19 is a block diagram of a parsing system according to a fifth embodiment of the present invention. In this figure, like reference numerals are used to denote corresponding components to those in FIG. 12 and their detailed description is omitted.

The parsing system of FIG. 19 includes subject-of-analysis input unit 11, dictionary unit 12, grammatical rule unit 14, dictionary consultation/ending-of-word processing unit 21, analysis table unit 23, and analysis preprocessing unit 24, which are the same as the corresponding respective components in FIG. 12. In this case, parsing unit 31 alone is distinct from the corresponding component 22 in FIG. 12.

In addition to the processing by the parsing unit 22 of FIG. 12, the parsing unit 31 excludes some of candidates for parsing by frequency of appearance and reutilizes excluded candidates when need arises.

In this parsing system as well, as the analysis table a CYK type table is used. In each of the cells of the analysis table there is stored a pointer to the result of analysis for a corresponding portion of an original sentence.

In the i, j-th cell there is stored information on a partial word string with a length of j from the i-th word in the original sentence.

Taking a sentence "The can press machine" by way of example, the process of parsing will be described.

Figure 20:
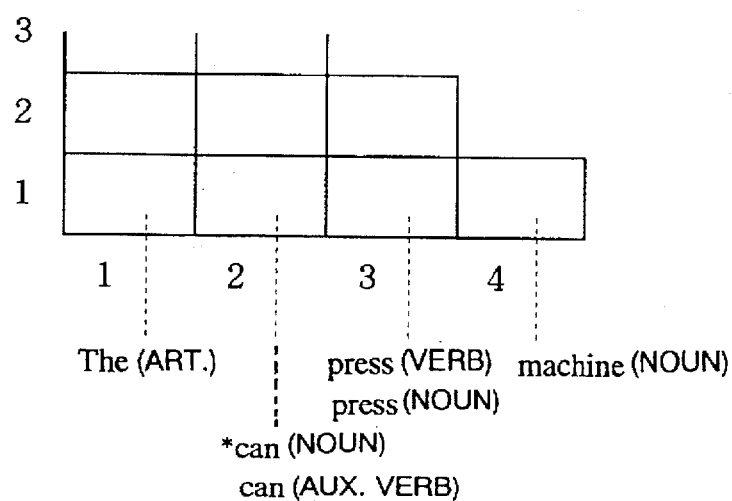
FIG. 20 is a schematic diagram for use in explanation of the analysis table in processing low-frequency candidates for parsing in the parsing system of FIG. 19.

Through the processing by the subject-of-analysis input unit 11 and the dictionary consultation/ending-of-word processing unit 21, the analysis table in the analysis table unit 23 is placed in the state in which only the first row has been filled as shown in FIG. 20. In the cell in the first row and the i-th column there is stored a pointer to information on the i-th input word. In this state grammatical rules are applied in sequence. Examples of grammatical rules are given by

| (1) sentence | → | noun phrase + verbal phrase |
| (2) noun phrase | → | noun |
| (3) noun phrase | → | noun + noun phrase |
| (4) noun phrase | → | article + noun |
| (5) verbal phrase | → | verb |
| (6) verbal phrase | → | verb + noun |
| (7) verbal phrase | → | auxiliary verb + verbal phrase |
| the (article) | | |
| can (auxiliary verb, *noun) | | |
| press (noun, verb) | | |
| machine (noun) | | |

Here, for the first analysis, parts of speech that are low in frequency of appearance are excluded. In this example, it is supposed that the frequency of "can" (noun) marked with * is low.

First, the grammar is applied to fill the second column. "can" and "press" become a verbal phrase by rule (7), and "press" and "machine" respectively become a noun phrase and a verbal phrase by rule (3) and rule (6).

Next, the third column is filled. "can" and "press machine" become a verbal phrase by rule (7).

Figure 21:
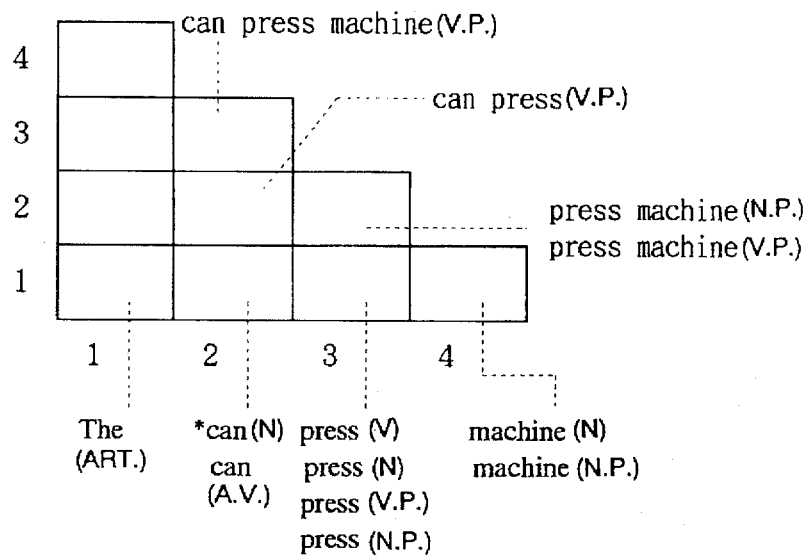
FIG. 21 is a schematic diagram for use in explanation of the analysis table at the time of failure in analyzing low-frequency candidates in the parsing system of FIG. 19.

Finally, the fourth column cannot be filled. This is due to the fact that there is no rule that provides a link between an article and a verbal phrase. Namely, this case corresponds to a failed analysis. This state is shown in FIG. 21.

When an analysis ends in failure, a candidate that has been excluded as a low-frequency word is added to the input for reanalysis. The reanalysis is made in such a way as to add only a portion associated with an excluded word, with the result of the previous analysis preserved and without repeating the same processing as the previous analysis.

Figure 22:
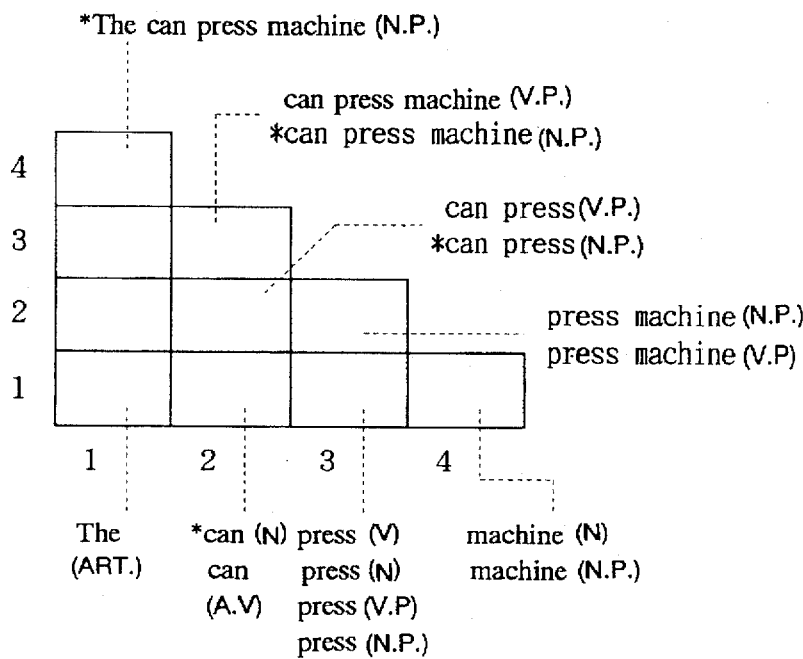
FIG. 22 is a schematic diagram for use in explanation of the parsing table at the time of success in analyzing low-frequency candidates in the parsing system of FIG. 19.

From "can" (noun) a noun phrase of "can press" is constructed by rule (3) and further a noun phrase of "can press machine" is constructed by rule (3). This will permit "the" and "can press machine" to construct a noun phrase by rule (4), achieving success in the analysis. As a result, the analysis table will be completed as shown in FIG. 22, with successful analysis.

Next, a description will be made of a method of deciding ranking among candidates for analysis taking, as an example, a sentence "I like flowers like roses"

and using the following grammar and dictionary.

| (1) sentence | → | noun phrase + verbal phrase |
| (2) sentence | → | pronoun + verbal phrase |
| (3) noun phrase | → | noun |
| (4) noun phrase | → | noun + prepositional phrase |
| (5) noun phrase | → | article + noun |
| (6) verbal phrase | → | verb |

| | | |
|---|---|---|
| (7) verbal phrase | → | verb + noun |
| (8) verbal phrase | → | verb + prepositional phrase |
| (9) prepositional phrase | → | prep. + noun |

I (pronoun)
like (verb, prep.)
flowers (noun, verb)
like (verb, prep.)
roses (noun)

A description will be made of a method, in the case where there are over a predetermined number of candidates for analysis in the same string of words, for increasing the efficiency of analysis by deciding ranking among these candidates and stopping candidates which are below a predetermined rank from becoming candidates for subsequent parsing. For simplicity of description assume here that the predetermined number is two and the predetermined rank is one. That is, with a word string having two or more characters, the subsequent analysis is made of only one candidate, i.e., the candidate in the highest rank.

Figure 23:
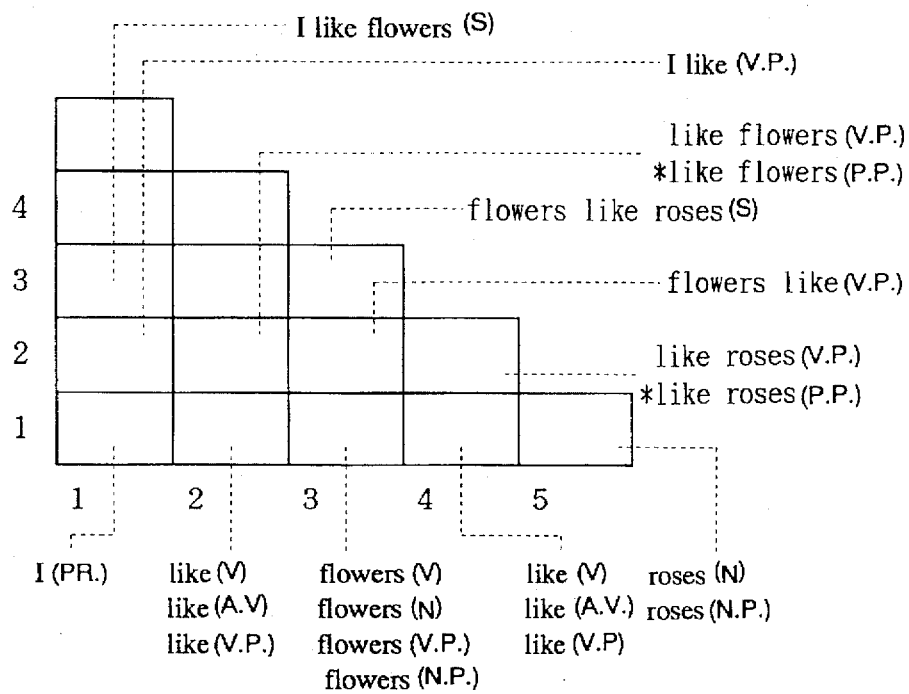
FIG. 23 is a schematic diagram for use in explanation of the analysis table at the time of failure in analysis in the ranking process in the parsing system of FIG. 19.

The procedure of the analysis is the same as described above. "like"+"flowers" becomes a verbal phrase by rule (7) and a prepositional phrase by rule (9). Assume that the verbal phrase is above the prepositional phrase in rank as the result of evaluation of the two candidates of "like flowers". Then, only the verbal phrase is applied to the subject of subsequent analysis. Such is the case with "like"+"roses". Then, the analysis stops in the state of FIG. 23, resulting in analysis failure. In FIG. 23, the candidate removed from the analysis is shown marked with *.

Figure 24:
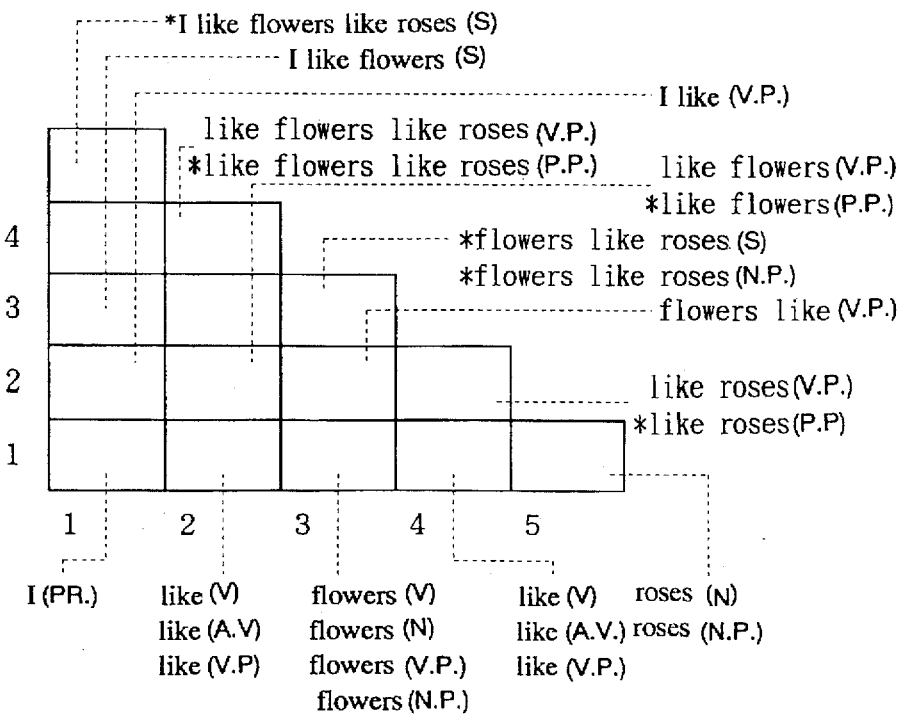
FIG. 24 is a schematic diagram for use in explanation of the analysis table at the time of success in analysis in the ranking process in the parsing system of FIG. 19.

In the event of analysis failure, reanalysis is made of a candidate which has been left out of application of rules. At this point, the contents of the analysis table produced at the time of the first analysis are utilized as they are for the second analysis. That is, in the case of analyses made on the second time and thereafter, portions associated with candidates having application restrictions removed anew are added. As a result, the analysis table will be completed as shown in FIG. 24, with successful analysis.

For simplicity, description was made herein of analysis in the case where candidates in the same word string are restricted to one. Of course, more than one candidate may be analyzed. Moreover, it would also be possible to restrict the scope of candidates within the same part of speech. Furthermore, a system would be possible in which candidates are divided into three or more groups and analysis is made for each group.

Thus, in the parallel parsing system that makes analysis while recording the process of the analysis, the accuracy and efficiency of analysis can be increased, where many candidates for analysis are present in the same string of words, by restricting application of a grammar to some candidates that are low in possibility.

Merely restricting the scope of parts of speech for analysis to thereby improve the performance is conventionally known. The parsing system of the present invention is permitted to increase the efficiency of analysis not by making the analysis over again but by making additions to the results of previous analyses while making use of the features inherent in the parallel parsing.

In this case, not only parts of speech but also a wide range of word-string candidates can become the subject of restriction, permitting a more efficient analysis to be made.

In general, rules with many daughter categories often describe special syntactic patterns. With such rules, the number of times they are applied is reduced. Then, in order to prioritize a subtree using restrictive rules, it will also be possible to prioritize a subtree which is small in the number of times rules are applied.

In this case, the following addition is made to the grammar used in the third embodiment, i.e., the system of FIG. 3.

NP→NP NP

In the analysis table there is stored a pointer to a subtree constructed of a corresponding string of characters. When there are a plurality of subtrees, they are linked by pointers one after another as shown in FIG. 25.

Figure 25:
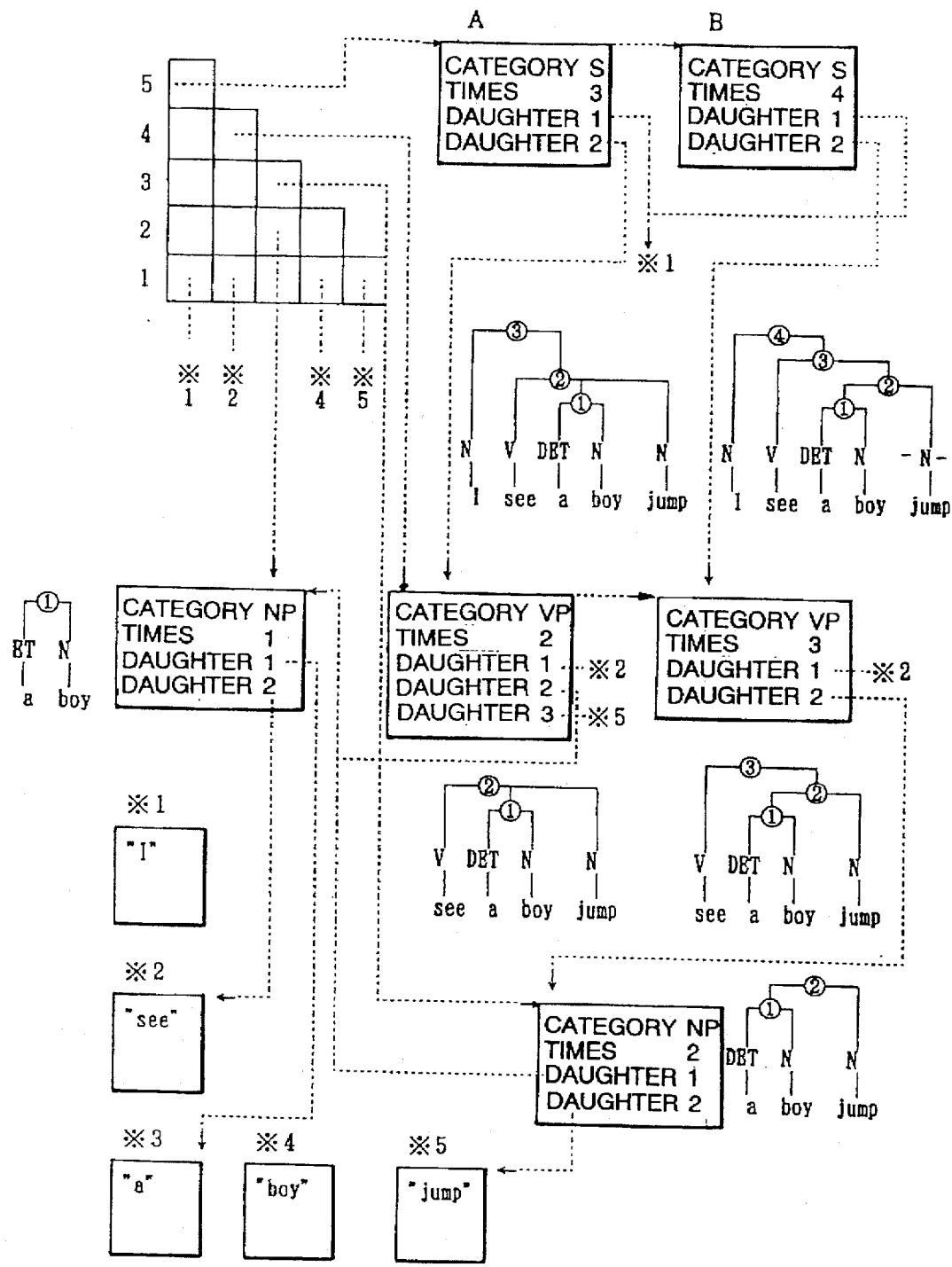
FIG. 25 is a schematic diagram for use in explanation of the processing for the number of applications of the grammar in the parsing system of FIG. 19.

FIG. 25 shows, as information on subtrees, pointers to subtrees each constructed from a category and a daughter category, and a relationship of reference to information when the number of applications of the grammar is considered. Besides, the subtree may be assigned a grammatical, semantic or control attribute.

In FIG. 25, two trees associated with the entire sentence are formed. A is three in the number of times rules are applied, while B is four. Thus, an assumption may be made such that A has priority over B.

In general, a preposition and an adverb phrase tend to be linked more closely with nearby expressions than distant expressions. For this reason, it will also be possible to assign a distance attribute indicating the total of linkage distances between modifying and modified words to each of subtrees and prioritize a subtree smaller in the total of linkage distances.

Figure 26A:
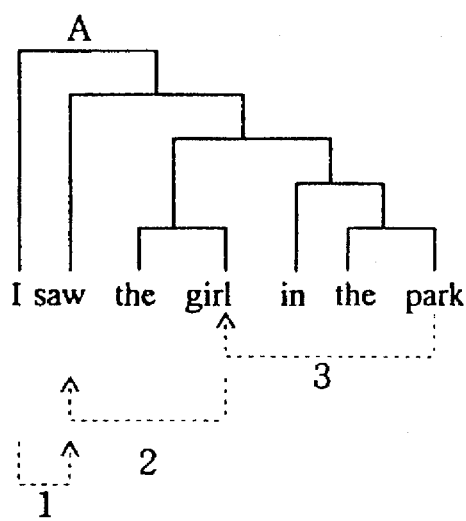
FIG. 26 is a schematic diagram for use in explanation of the processing for linkage distances in the parsing system of FIG. 19.
Figure 26B:
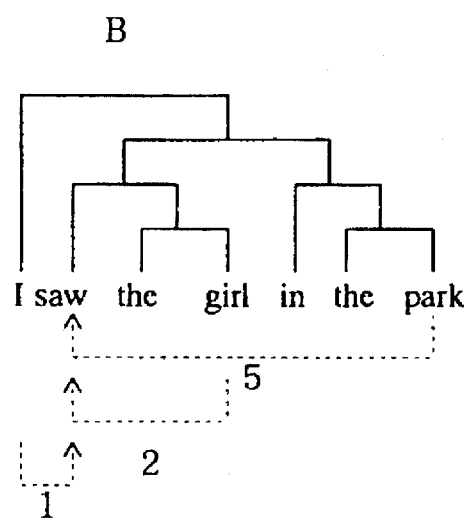

Though concrete examples shown in FIG. 26 are the same as those in the case of FIG. 25, each subtree is made to have linkage distance information as shown in FIG. 26. The linkage distance is calculated when the grammar is applied and the mother category is produced.

The linkage distance is the sum of linkage distances of daughter categories plus distances between modifying and modified words which are daughter categories.

Figure 27:
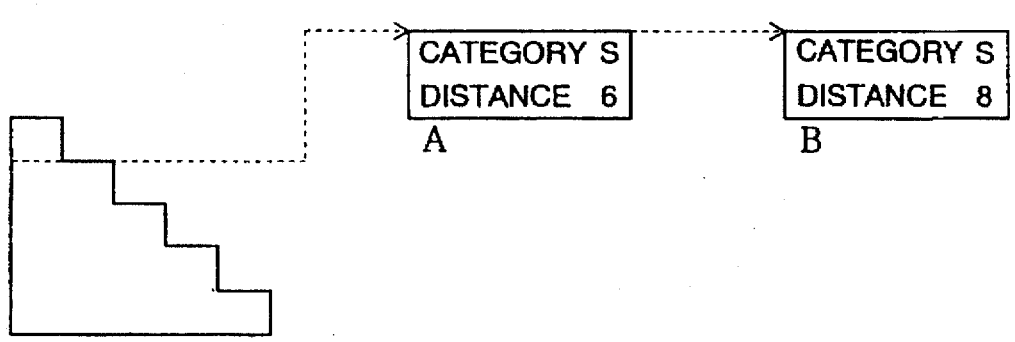
FIG. 27 is a schematic diagram for use in explanation of the processing for linkage distances in the parsing system of FIG. 19.

In the example of FIG. 27, the linkage distances amount to 6 in A and 8 in B. Thus, A has priority over B.

In grammatical rules are mixed rules which conform to an ordinary grammar and should preferably be applied and rules which should not be applied as much as possible, such as rules added for non-sentence-like expressions. Then, each of grammatical rules can be given a mark (mark of weighting or estimation) so that each subtree can be made to have an attribute indicating the total of marks of applied rules.

Figure 28A:
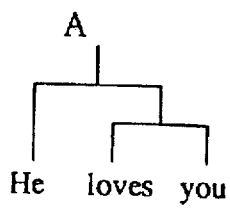
FIG. 28 is a schematic diagram for use in explanation of the processing for grammatical marks in the parsing system of FIG. 19.
Figure 28B:
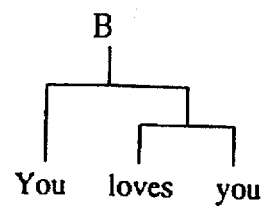
Figure 28C:
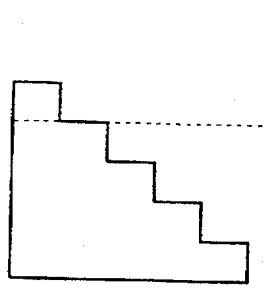

FIG. 28 shows an example of such a case, in which case, instead of

S→NP VP in the grammatical rules used in the third embodiment, or the system of FIG. 3, the following rules are used:

| | | |
|---|---|---|
| 1: | | |
| S | | |
| → NP (third person, singular, present) | | VP (with s) |
| −1: | | |
| S | | |
| → NP (second person) | | VP (with s) |

The numeral before the mother category denotes a mark assigned to the corresponding grammatical rule. A subtree in which rules with higher marks are applied is treated more preferentially.

In this case, a grammar which should be positively applied is given a plus mark, while a grammar which should not be applied if possible is given a minus mark.

That is, this example, though substantially the same as that of FIG. 25, assigns information on grammatical marks to subtrees. Such a grammatical mark is calculated when a grammar is applied and its mother category is produced.

A is an example of an application of a grammar with a mark of +1 to a link between the subject and a verbal phrase, and B is an example of application of a grammar with a mark of −1 to the same link. The grammatical mark for the mother category is obtained by the sum of the total of grammatical marks for daughter categories and the grammatical mark for a rule being applied.

For example, assuming that, in FIG. 28, other grammars for producing the subtrees designated by A and B are all assigned a mark of 0, then the subtree A gets a mark of +1 and the subtree B gets a mark of −1. A has priority over B.

Figure 29A:
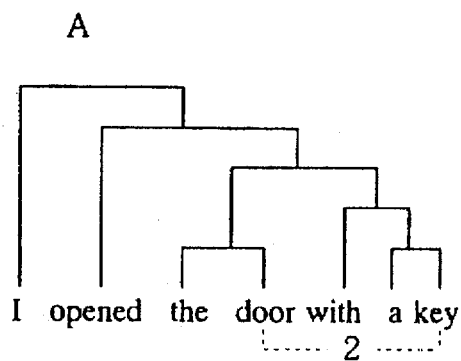
FIG. 29 is a schematic diagram for use in explanation of the processing for semantic marks in the parsing system of FIG. 19.
Figure 29B:
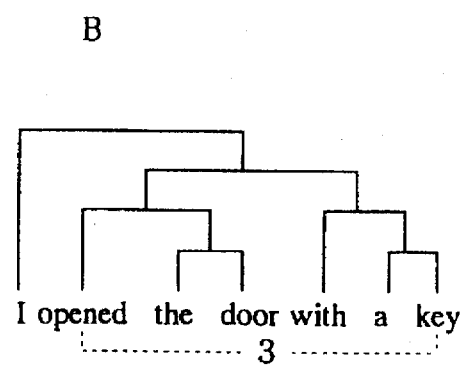
Figure 29C:
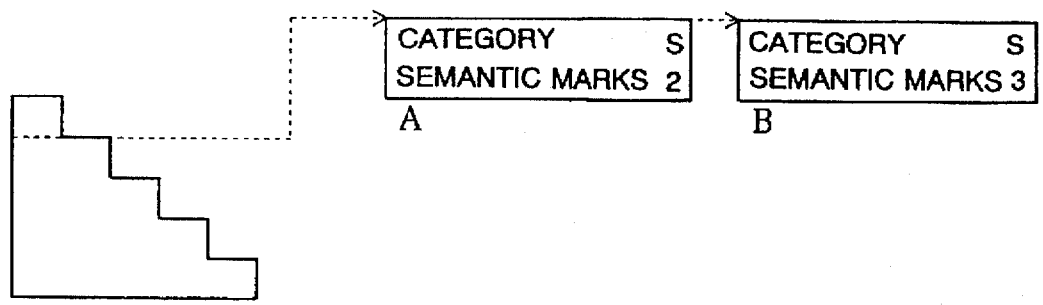

In addition, as shown in FIG. 29, the subtrees may be made to have semantic marks. The semantic marks are assigned to mother categories when grammars are applied and the mother categories are produced.

A semantic mark of a mother category is the sum of the total of semantic marks of daughter categories and a mark obtained when modification occurs between daughter categories.

The marks at the time of the occurrence of modification are acquired by referring to the following table:

| PREP. | MODIFYING ATTRIBUTE | MODIFIED ATTRIBUTE | MARK MARK |
|---|---|---|---|
| WITH | action verb | tool | 2 |
| WITH | action verb | human | 3 |
| TO | movement verb | place | 2 |
| ... | ... | ... | ... |

As an example, the case where an action verb is modified by a tool is given two marks. Thus, assignment of a semantic mark to a relationship of modification also permits the accuracy and efficiency of syntax analysis to be increased.

It is apparent that, in this invention, a wide range of different working modes can be formed based on the invention without deviating from the spirit and scope of the invention.

What is claimed is:

1. A parsing system comprising:
   input means for inputting a sentence or phrase of a natural language which serves as a subject of analysis;
   dictionary means for holding dictionary data for dictionary consultation for said subject of analysis of said natural language;
   morphemic analyzer means for recognizing breaks between every word by performing dictionary consultation on said subject of analysis;
   parsing means for holding grammatical rules for parsing in the form of a context-free grammar and applying said grammatical rules to said subject of analysis for parallel parsing;
   intermediate result storage means for storing syntactic category information in the intermediate results of an analysis by said parsing means and intermediate result information including parsing attribute information in predetermined storage locations; and
   table holding means for holding an analysis table which stores said storage locations for the intermediate results of the analysis in said intermediate result storage means and/or pointers to said storage locations.

2. A parsing system according to claim 1, wherein said parsing attribute information includes at least one of syntactic, semantic and control attributes.

3. A parsing system according to claim 1, wherein said intermediate result storage means stores said intermediate result information including information as to a distinction between a complete subtree which has fully satisfied rules and an incomplete subtree which has partially satisfied rules.

4. A parsing system according to claim 3, wherein said table holding means includes an active-edge table for an incomplete subtree and an inactive-edge table for a complete subtree, which serve as an analysis table for access to said intermediate result information.

5. A parsing system according to claim 1, wherein said table holding means includes, as said analysis table, a rule reference table using grammatical categories as keys.

6. A parsing system according to claim 1, further including analysis preprocessing means for carrying out preprocessing between dictionary consultation and parsing to thereby increase the accuracy of an analysis.

7. A parsing system according to claim 6, wherein said analysis preprocessing means includes polysemic word processing means for looking up a polysemic words in each of word groups which are the results of dictionary consultation and, when polysemic words are found, adding some or all of them to said analysis table beforehand.

8. A parsing system according to claim 6, wherein said analysis preprocessing means includes idiom processing means for examining the possibility that each of word groups which are the results of dictionary consultation may be an idiom and, if there is found the possibility of an idiom, adds its central word and invariant portion to said analysis table beforehand.

9. A parsing system according to claim 8, wherein said idiom processing means includes means for assigning to the central word of an idiom to be added to said analysis table an attribute indicating a grammatical feature of that idiom.

10. A parsing system according to claim 6, wherein said analysis preprocessing means includes constituent word processing means for, when words which are the results of dictionary consultation include an entry constructed of two or more words, adding each of constituent words in said entry to said analysis table for later analysis.

11. A parsing system according to claim 10, wherein said constituent word processing means adds said constituent words in said entry to said analysis table only when the first of said constituent words has a given attribute.

12. A parsing system according to claim 1, wherein said parsing means includes evaluation means for evaluating a plurality of subtree candidates corresponding to the same partial character string and deciding ranking among them in accordance with predetermined criteria.

13. A parsing system according to claim 12, wherein said intermediate result storage means includes means for assigning, as an attribute, information on the frequencies of appearance of every word counted by part of speech, and said evaluation means includes means for establishing, as the criteria for ranking, priority among subtrees with priority increasing in ascending order of frequencies of appearance of words therein.

14. A parsing system according to claim 12, wherein said intermediate result storage means includes means for assigning, as an attribute, information as to how many times the rules have been applied, and said evaluation means includes means for establishing, as the criteria for ranking, priority among subtrees with priority increasing in descending order of the number of times the rules are applied.

15. A parsing system according to claim 12, wherein said intermediate result storage means includes means for assigning, as an attribute, information on the total of distances between every modifier and modified word, and said evaluation means includes means for establishing, as the criteria for ranking, priority among subtrees with priority increasing in decreasing order of the total of distances.

16. A parsing system according to claim 12, wherein said intermediate result storage means includes means for assigning, as an attribute, information on the total of marks assigned to the applied rules, and said evaluation means includes means for establishing, as the criteria for ranking, priority among subtrees with priority increasing in increasing order of the total of marks assigned to the applied rules.

17. A parsing system according to claim 12., wherein said intermediate result storage means includes means for assigning, as an attribute, information on an evaluation value for a semantic distance between a modifier and a modified word, and said evaluation means includes means for establishing, as the criteria for ranking, priority among subtrees with priority increasing in increasing order of the evaluation value.

18. A parsing system according to claim 12, in which said evaluation means for making unavailable for subsequent analysis some of analysis tree candidates of low ranking of a plurality of analysis tree candidates for the same partial character string among which ranking has been established.

19. A parsing system according to claim 18, wherein said evaluation means includes means for, when the unavailability of the partial analysis tree candidates of low ranking results in a failure in the entire analysis, retrying the failed analysis using said partial tree candidates which have been made unavailable previously to make up for failed analysis trees.

* * * * *